(12) United States Patent
Jeong et al.

(10) Patent No.: US 12,493,376 B2
(45) Date of Patent: Dec. 9, 2025

(54) ELECTRONIC DEVICE

(71) Applicant: Samsung Display Co., Ltd., Yongin-si (KR)

(72) Inventors: Hwan-Hee Jeong, Yongin-si (KR); Deokjung Kim, Yongin-si (KR); Won-Il Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/797,193

(22) Filed: Aug. 7, 2024

(65) Prior Publication Data

US 2025/0068270 A1 Feb. 27, 2025

(30) Foreign Application Priority Data

Aug. 24, 2023 (KR) .................. 10-2023-0111538
Nov. 6, 2023 (KR) .................. 10-2023-0151747

(51) Int. Cl.
*G06F 3/041* (2006.01)
*G06F 3/044* (2006.01)
*H10K 59/131* (2023.01)

(52) U.S. Cl.
CPC ........ *G06F 3/04162* (2019.05); *G06F 3/0412* (2013.01); *G06F 3/04166* (2019.05); *G06F 3/0446* (2019.05); *G06F 3/0448* (2019.05); *H10K 59/131* (2023.02); *G06F 2203/04111* (2013.01)

(58) Field of Classification Search
CPC . G06F 2203/04103; G06F 2203/04106; G06F 2203/04111; G06F 2203/04112; G06F 3/0412; G06F 3/04162; G06F 3/04166; G06F 3/0443; G06F 3/0446; G06F 3/0448

See application file for complete search history.

(56) References Cited

U.S. PATENT DOCUMENTS

| 8,358,284 | B2 | 1/2013 | Jeong et al. | |
|---|---|---|---|---|
| 11,809,668 | B2 | 11/2023 | Lim et al. | |
| 2009/0213090 | A1* | 8/2009 | Mamba | G06F 3/0446 345/174 |
| 2015/0029423 | A1* | 1/2015 | Huang | G06F 3/0443 349/12 |
| 2015/0220181 | A1* | 8/2015 | Jung | G06F 3/0446 345/174 |

(Continued)

FOREIGN PATENT DOCUMENTS

| KR | 10-2022-0140084 A | 10/2022 |
|---|---|---|
| KR | 10-2023-0082167 A | 6/2023 |

*Primary Examiner* — Robin J Mishler
(74) *Attorney, Agent, or Firm* — Womble Bond Dickinson (US) LLP

(57) ABSTRACT

An electronic device including a display panel including a plurality of light emitting elements, and an input sensor on the display panel. The input sensor includes a transmission electrode including a plurality of first transmission patterns arranged in a first direction, and a reception electrode crossing the transmission electrode and including a plurality of first reception patterns arranged in a second direction crossing the first direction. Each of the first transmission patterns extends in the first direction and has a zigzag shape, and each of the first reception patterns extends in the second direction and has a zigzag shape.

36 Claims, 20 Drawing Sheets

(56) References Cited

U.S. PATENT DOCUMENTS

| | | |
|---|---|---|
| 2019/0050076 A1* | 2/2019 | Zhang .................. G06F 3/0448 |
| 2019/0056821 A1 | 2/2019 | Choi et al. |
| 2020/0019279 A1 | 1/2020 | Xie et al. |
| 2021/0191572 A1 | 6/2021 | Kwon et al. |
| 2021/0397298 A1 | 12/2021 | Choi et al. |
| 2022/0020824 A1* | 1/2022 | Na ....................... G06F 3/0443 |
| 2022/0075482 A1 | 3/2022 | Lim |
| 2023/0168780 A1 | 6/2023 | Lee et al. |

* cited by examiner

< First Mode >

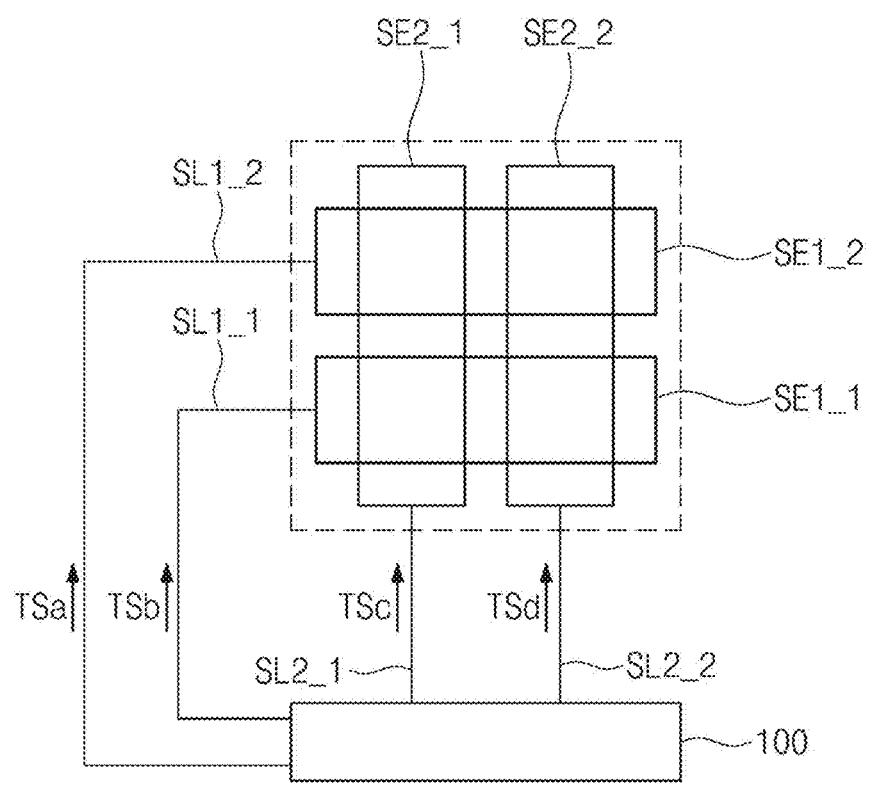

< Second Mode >

ELECTRONIC DEVICE

CROSS-REFERENCE TO RELATED APPLICATIONS

The present application claims priority to and the benefit of Korean Patent Application No. 10-2023-0111538 filed on Aug. 24, 2023, and Korean Patent Application No. 10-2023-0151747 filed on Nov. 6, 2023, in the Korean Intellectual Property Office, the entire contents of which are incorporated herein by reference.

BACKGROUND

1. Field

Embodiments of the present disclosure described herein are related to an electronic device, and more particularly, to an electronic device having improved input sensing performance.

2. Description of the Related Art

Multimedia electronic devices such as televisions, mobile phones, tablet computers, navigation devices, and game consoles are equipped with display devices for displaying images. The electronic devices may be provided with an input sensor that may provide a touch-based input manner that allows a user to input information and commands easily and intuitively in addition to a general input manner such as a button, a keyboard, and a mouse.

The input sensor may sense touch or pressure using a body of the user. In some embodiments, the demand of use of an active pen for detailed touch input for the user who is accustomed to inputting information using a writing instrument or a specific application (e.g., an application for sketching or drawing) is increasing.

SUMMARY

Aspects according to one or more embodiments of the present disclosure are directed toward an electronic device having improved sensing performance for input using an active pen.

Additional aspects will be set forth in part in the description which follows and, in part, will be apparent from the description, or may be learned by practice of the presented embodiments of the present disclosure.

According to some embodiments, an electronic device includes a display panel including a plurality of light emitting elements, and an input sensor disposed on the display panel. The input sensor includes a transmission electrode including a plurality of first transmission patterns arranged in a first direction, and a reception electrode crossing the transmission electrode and including a plurality of first reception patterns arranged in a second direction crossing the first direction. Each of the first transmission patterns generally extends in the first direction and has a zigzag shape, and each of the first reception patterns generally extends in the second direction and has a zigzag shape.

According to some embodiments, the transmission electrode may further include a plurality of second transmission patterns arranged in the first direction and spaced apart from the first transmission patterns in the second direction, and a first connection pattern that electrically connects at least one of the first transmission patterns and at least one of the second transmission patterns to each other, and each of the second transmission patterns may generally extend in the first direction and have a zigzag shape.

According to some embodiments, the reception electrode may further include a plurality of second reception patterns arranged in the second direction and spaced apart from the first reception patterns in the first direction, and a second connection pattern that electrically connects at least one of the first reception patterns and at least one of the second reception patterns to each other, and each of the second reception patterns may generally extend in the second direction and have a zigzag.

According to some embodiments, the electronic device may further include a plurality of first connection patterns and a plurality of second connection patterns.

According to some embodiments, the input sensor may further include dummy electrodes arranged between the transmission electrode and the reception electrode, at least one dummy electrode among the dummy electrodes may be disposed between two first connection patterns adjacent to each other in the first direction among the first connection patterns, and at least one dummy electrode among the dummy electrodes may be disposed between two second connection patterns adjacent to each other in the second direction among the second connection patterns.

According to some embodiments, a width of the first connection pattern may be different from widths of the first transmission patterns and the second transmission patterns, and a width of the second connection pattern may be different from widths of the first reception patterns and the second reception patterns.

According to some embodiments, the width of the first connection pattern may be smaller than the widths of the first transmission patterns and the second transmission patterns, and the width of the second connection pattern may be smaller than the widths of the first reception patterns and the second reception patterns.

According to some embodiments, the width of the first connection pattern may be the same as the width of the second connection pattern.

According to some embodiments, the transmission electrode may further include a plurality of first bridge patterns that electrically connect the first transmission patterns, and a plurality of second bridge patterns that electrically connect the second transmission patterns.

According to some embodiments, the first bridge patterns and the second bridge patterns may be arranged alternately in the first direction.

According to some embodiments, the reception electrode may further include a plurality of third bridge patterns that electrically connect the first reception patterns, and a plurality of fourth bridge patterns that electrically connect the second reception patterns.

According to some embodiments, the third bridge patterns and the fourth bridge patterns may be arranged alternately in the second direction.

According to some embodiments, the first bridge patterns and the second bridge patterns may be disposed on a different layer from those of the first transmission patterns and the second transmission patterns, and the third bridge patterns and the fourth bridge patterns may be disposed on a different layer from those of the first reception patterns and the second reception patterns.

According to some embodiments, the first connection pattern may have a zigzag shape generally extending in the second direction, and the second connection pattern may have a zigzag shape generally extending in the first direction.

According to some embodiments, the input sensor may further include dummy electrodes arranged between the transmission electrode and the reception electrode and electrically insulated from the transmission electrode and the reception electrode.

According to some embodiments, each of the dummy electrodes may include a plurality of dummy patterns electrically insulated from each other.

According to some embodiments, a side surface of each of the dummy electrodes may have a zigzag shape to correspond to shapes of the first transmission patterns and the first reception patterns adjacent to each of the dummy electrodes.

According to some embodiments, the input sensor may further include buffer electrodes surrounding the dummy electrodes.

According to some embodiments, the buffer electrodes may be electrically insulated from the dummy electrodes, the transmission electrode, and the reception electrode.

According to some embodiments, the buffer electrodes may include a plurality of buffer patterns spaced apart from each other.

According to some embodiments, a width of each of the dummy electrodes may be greater than a width of each of the buffer electrodes.

According to some embodiments, at least one of the light emitting elements arranged in the first direction may overlap side surfaces of the first transmission patterns on a plane.

According to some embodiments, a plurality of cross areas in which the first transmission patterns and the first reception patterns cross each other may be defined in the input sensor, and each of the cross areas includes a plurality of boundary areas in which one surfaces of the first transmission patterns and one surfaces of the first reception patterns face each other.

According to some embodiments, a plurality of transmission electrodes may be provided, and the transmission electrodes may be arranged in the second direction, and a plurality of reception electrodes may be provided, and the reception electrodes are arranged in the first direction.

According to some embodiments, the input sensor may sense a first input in a first mode and sense a second input in a second mode, and the electronic device may further include an input device that provides the second input to the input sensor.

According to some embodiments, an electronic device includes a display panel including a plurality of light emitting elements, and an input sensor disposed on the display panel. The input sensor may include a plurality of transmission electrodes generally extending in a first direction and arranged in a second direction crossing the first direction, a plurality of reception electrodes generally extending in the second direction and arranged in the first direction, dummy electrodes arranged between the transmission electrodes and the reception electrodes and electrically insulated from the transmission electrodes and the reception electrodes, and a plurality of buffer electrodes arranged between the dummy electrodes and the transmission electrodes and between the dummy electrodes and the reception electrodes The buffer electrodes may be electrically insulated from the dummy electrodes, the transmission electrodes, and the reception electrodes.

According to some embodiments, each of the transmission electrodes may include a plurality of first transmission patterns arranged in the first direction, a plurality of second transmission patterns arranged in the first direction and spaced apart from the first transmission patterns in the second direction, and a plurality of first connection patterns that electrically connect the first transmission patterns and the second transmission patterns to each other.

According to some embodiments, each of the reception electrodes may include a plurality of first reception patterns arranged in the second direction, a plurality of second reception patterns arranged in the second direction and spaced apart from the first reception patterns in the first direction, and a plurality of second connection patterns that electrically connect the first reception patterns and the second reception patterns to each other.

According to some embodiments, each of the first transmission patterns and the second transmission patterns may generally extend in the first direction and have a zigzag shape, and each of the first reception patterns and the second reception patterns may generally extend in the second direction and have a zigzag shape.

According to some embodiments, at least one dummy electrode among the dummy electrodes may be disposed between two first connection patterns adjacent to each other in the first direction among the first connection patterns, and at least one dummy electrode among the dummy electrodes may be disposed between two second connection patterns adjacent to each other in the second direction among the second connection pattern.

According to some embodiments, the buffer electrodes may be spaced apart from the first transmission patterns, the second transmission patterns, the first reception patterns, and the second reception patterns.

According to some embodiments, at least one of the dummy electrodes may include a first sub-dummy electrode and a second sub-dummy electrode separated by the first connection patterns or the second connection patterns.

According to some embodiments, the transmission electrodes may have a bar shape generally extending in the first direction, and the reception electrodes may have a bar shape generally extending in the second direction.

According to some embodiments, each of the dummy electrodes may include a plurality of dummy patterns electrically insulated from each other.

According to some embodiments, the buffer electrodes may include a plurality of buffer patterns spaced apart from each other.

According to some embodiments, a width of the dummy electrodes may be greater than a width of the buffer electrodes.

BRIEF DESCRIPTION OF THE DRAWINGS

The above and other objects and features of the present disclosure will become apparent by describing in detail embodiments thereof with reference to the accompanying drawings.

FIGS. 7A and 7B are views for describing the operation of the input sensor in a second mode.

DETAILED DESCRIPTION

Figure 1A:
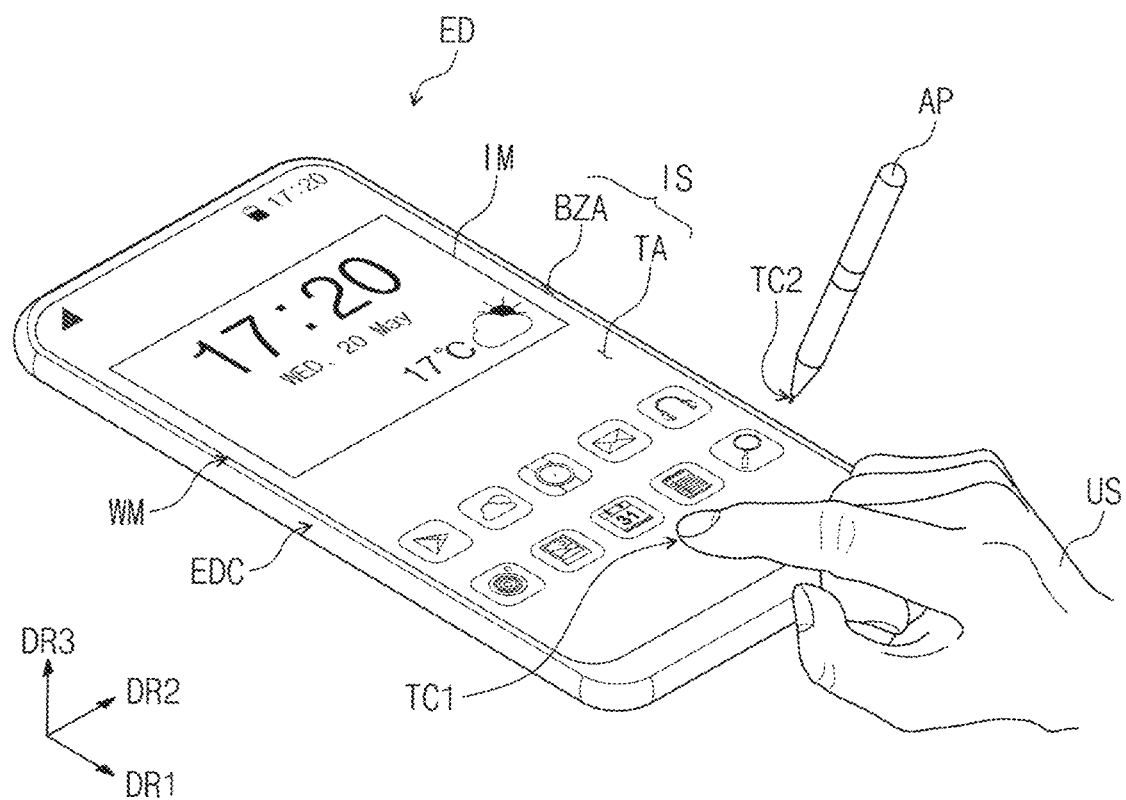
FIG. 1A is a perspective view of an electronic device according to some embodiments of the present disclosure.

Since the present disclosure is variously modified and has alternative forms, an embodiment thereof will be illustrated in the drawings and will be described herein in detail. However, it should be understood that the present disclosure is not limited to a specific disclosure and includes all changes, equivalents, and substitutes included in the spirit and scope of the present disclosure.

In the present specification, the expression that a first component (or an area, a layer, a part, a portion, etc.) is "disposed on", "connected with" or "coupled to" a second component means that the first component is directly disposed on/connected with/coupled to the second component or means that a third component is interposed therebetween.

The same reference numerals refer to the same components. Further, in the drawings, the thickness, the ratio, and the dimension of components are exaggerated for effective description of technical contents.

The term "and/or" includes all combinations of one or more components that may be defined by associated configurations.

The terms "first", "second", etc. are used to describe various components, but the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

Further, the terms "under", "beneath", "on", "above", etc. are used to describe a relationship between components illustrated in the drawings. The terms have relative concepts and are described with reference to a direction indicated in the drawing.

Unless otherwise defined, all terms (including technical terms and scientific terms) used in the present specification have the same meaning as commonly understood by those skilled in the art to which the present disclosure belongs. Further, terms defined should be construed as having the same meanings as those in the context of the related art, and are explicitly defined therein unless the terms are interpreted in an ideal or excessive formal meaning.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, some embodiments of the present disclosure will be described with reference to the accompanying drawings.

Figure 1B:
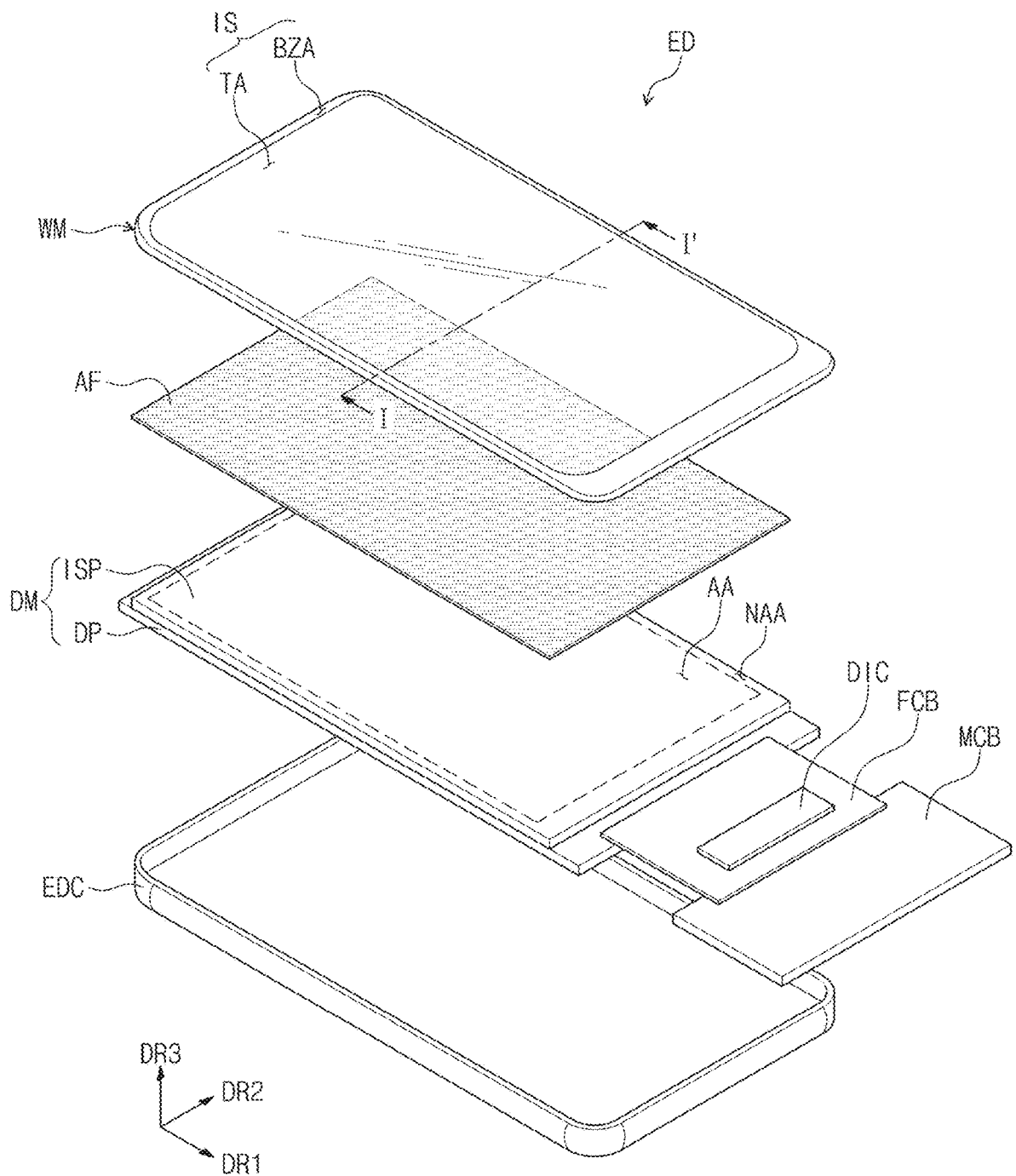
FIG. 1B is an exploded perspective view of the electronic device according to some embodiments of the present disclosure.
Figure 2A:
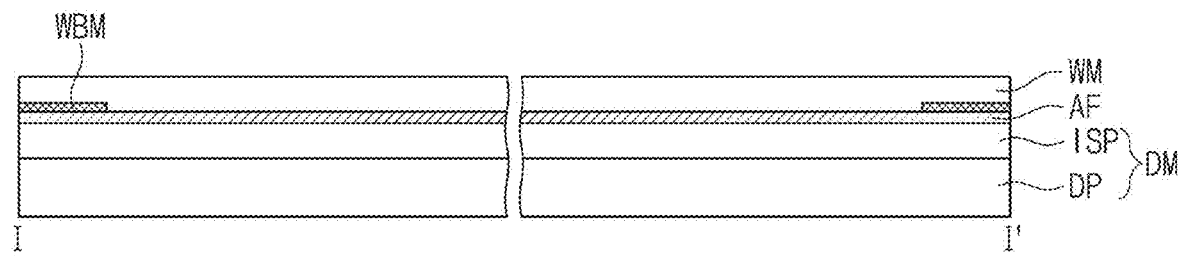
FIG. 2A is a cross-sectional view of the electronic device along line I-I' illustrated in FIG. 1B according to some embodiments of the present disclosure.
Figure 2B:
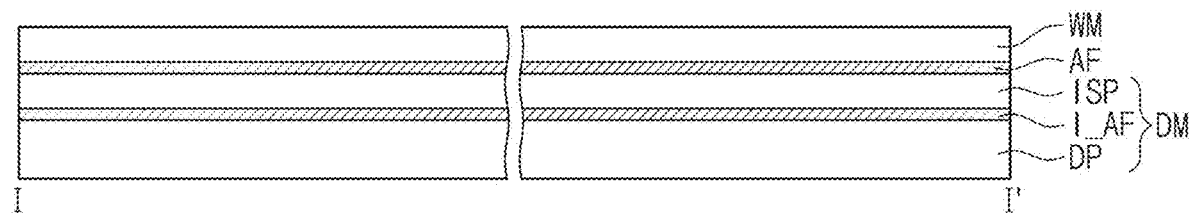
FIG. 2B is a cross-sectional view of the electronic device along line I-I' illustrated in FIG. 1B according to some embodiments of the present disclosure.

FIG. 1A is a perspective view of an electronic device according to some embodiments of the present disclosure, and FIG. 1B is an exploded perspective view of the electronic device according to some embodiments of the present disclosure. FIGS. 2A and 2B are cross-sectional views of the electronic device along line I-I' illustrated in FIG. 1B according to some embodiments of the present disclosure.

Referring to FIGS. 1A to 2B, an electronic device ED may be a device that is activated according to an electric signal. The electronic device ED may include or more suitable embodiments. For example, the electronic device ED may be applied to electronic devices such as a smart watch, a tablet, a laptop, a computer, a smart television, and/or the like.

The electronic device ED may display an image IM in a third direction DR3 on a display surface IS, and the display surface IS may be parallel to a first direction DR1 and a second direction DR2. The display surface IS on which the image IM is displayed may correspond to a front surface of the electronic device ED. The image IM may include a still image as well as a dynamic image.

In some embodiments, a front surface (or an upper surface) and a rear surface (or a lower surface) of each member are defined with respect to a direction, in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the electronic device ED in the third direction DR3. In some embodiments, directions indicated by the first to third directions DR1, DR2, and DR3 are relative concepts and may be changed to other directions.

The electronic device ED may sense an external input applied from the outside. The external input may include one or more suitable types of inputs provided from the outside of the electronic device ED. The electronic device ED according to some embodiments of the present disclosure may sense a first input TC1 of a user US applied from the outside. The first input TC1 of the user US may be any one or combinations of one or more suitable types of external inputs, such as a portion of a body of a user, light, heat, pressure, and/or the like. In some embodiments, the first input TC1 of the user US is descried as an example of a touch input by a hand of the user US applied to the front surface, but this is illustrative, and as described above, the first input TC1 of the user US may be provided in one or more suitable types. Further, the electronic device ED may sense the first input TC1 of the user US applied to a side surface or a rear surface of the electronic device ED depending on a structure of the electronic device ED, but is not limited to an embodiment.

Further, the electronic device ED according to some embodiments of the present disclosure may sense a second input TC2 applied from the outside. The second input TC2 may include inputs by an input device AP (e.g., a stylus pen, an active pen, a touch pen, an electronic pen, an e-pen, and the like) in addition to the hand of the user US. In the following description, a case in which the second input TC2 is an input by the active pen will be described as an example.

The front surface of the electronic device ED may be divided into a transmissive area TA and a bezel area BZA. The transmissive area TA may be an area on which the image IM is displayed. The user visually recognizes the image IM through the transmissive area TA. In some embodiments, the transmissive area TA is illustrated as a quadrangular shape having rounded vertexes. However, this is illustrated as an example, the transmissive area TA may have one or more suitable shapes, and the present disclosure is not limited to an embodiment.

The bezel area BZA is adjacent to the transmissive area TA. The bezel area BZA may have a set (or predetermined) color. The bezel area BZA may surround the transmissive area TA. Accordingly, a shape of the transmissive area TA may be substantially defined by the bezel area BZA. However, this is illustrated as an example, and the bezel area BZA may be disposed adjacent to only one side of the transmissive area TA or may not be provided. The electronic device ED according to some embodiments of the present disclosure may include one or more suitable embodiments and is not limited to an embodiment.

Referring to FIG. 1B, the electronic device ED may include a display module DM and a window WM disposed on the display module DM. The display module DM may include a display panel DP and an input sensor ISP.

The display panel DP according to some embodiments of the present disclosure may be a light emitting display panel, but the present disclosure is not particularly limited thereto. For example, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot, a quantum rod, and/or the like. Hereinafter, the display panel DP is described as the organic light emitting display panel.

Referring to FIG. 2A, the input sensor ISP may be directly disposed on the display panel DP. According to some embodiments of the present disclosure, the input sensor ISP may be formed on the display panel DP through a continuous process. For example, when the input sensor ISP is directly disposed on the display panel DP, an adhesive film is not disposed between the input sensor ISP and the display panel DP. However, as illustrated in FIG. 2B, an internal adhesive film I_AF may be disposed between the input sensor ISP and the display panel DP. In this case, the input sensor ISP is not manufactured through a continuous process together with the display panel DP and may be fixed to an upper surface of the display panel DP by the internal adhesive film I_AF after manufactured through a separate process from that of the display panel DP.

The display panel DP generates an image, and the input sensor ISP acquires coordinate information of the external input (e.g., the first and second inputs).

The window WM may be made of a transparent material through which an image may be output. For example, the window WM may be made of glass, sapphire, plastic, and/or the like. The window WM is illustrated as a single layer, but the present disclosure is not limited thereto, and the window WM may include a plurality of layers. In some embodiments, the bezel area BZA of the electronic device ED may be substantially provided as an area in which a material including a set (or predetermined) color is printed on one area of the window WM. As an example of the present disclosure, the window WM includes a light shielding pattern WBM for defining the bezel area BZA. The light shielding pattern WBM, which is a colored organic film, may be formed by, for example, a coating method.

The window WM may be coupled to the display module DM through an adhesive film AF. As an example of the present disclosure, the adhesive film AF may include an optically clear adhesive (OCA) film. However, the adhesive film AF is not limited thereto and may include a general adhesive, bonding agent, and/or the like. For example, the adhesive film AF may include an optically clear resin (OCR) or a pressure-sensitive adhesive (PSA) film.

A reflection preventing layer may be further disposed between the window WM and the display module DM. The reflection preventing layer reduces reflectance of an external light beam input from an upper side of the window WM. The reflection preventing layer according to some embodiments of the present disclosure may include a phase retarder and a polarizer. The phase retarder may be of a film type or a liquid crystal coating type and may include a $\lambda$ phase retarder and/or a $\lambda/2$ phase retarder. The polarizer may be of a film type or a liquid crystal coating type. The film type may include a stretchable synthetic resin film, and the liquid crystal coating type may include liquid crystals arranged in a set (or predetermined) form. The phase retarder and the polarizer may be implemented as one polarization film.

As another example, the reflection preventing layer may include color filters directly arranged on the input sensor ISP or the display panel DP.

The display module DM may display the image according to an electrical signal and transmit/receive information on the external input. The display module DM may be defined by an active area AA and a peripheral area NAA. The active area AA may be defined as an area that is configured to emit an image provided by the display module DM.

The peripheral area NAA is adjacent to the active area AA. For example, the peripheral area NAA may surround the active area AA. However, this is illustrated as an example, the peripheral area NAA may be defined in one or more suitable shapes, and the present disclosure is not limited to an embodiment. According to some embodiments, the active area AA of the display module DM may correspond to at least a portion of the transmissive area TA.

The display module DM may further include a main circuit board MCB, a flexible circuit film FCB, and a driving chip DIC. The main circuit board MCB may be connected to the flexible circuit film FCB and electrically connected to the display panel DP. The main circuit board MCB may include a plurality of driving elements. The plurality of driving elements may include a circuit unit for driving the display panel DP. The flexible circuit film FCB is connected to the display panel DP and electrically connects the display panel DP and the main circuit board MCB. A driving chip DIC may be mounted on the flexible circuit film FCB.

The driving chip DIC may include driving elements, for example, data driving circuits, for driving pixels of the display panel DP. One flexible circuit film FCB according to some embodiments of the present disclosure is illustrated, but the present disclosure is not limited thereto, and a plurality of flexible circuit films FCB may be provided and connected to the display panel DP. Although a structure, in which the driving chip DIC is mounted on the flexible circuit film FCB, is illustrated in FIG. 1B, the present disclosure is not limited thereto. For example, the driving chip DIC may be directly mounted on the display panel DP. In this case, a portion of the display panel DP, on which the driving chip DIC is mounted, may be bent and disposed on a rear surface of the display module DM.

The input sensor ISP may be electrically connected to the main circuit board MCB through the flexible circuit film FCB. However, some embodiments of the present disclosure are not limited embodiment thereto. For example, the display module DM may additionally include a separate flexible circuit film for electrically connecting the input sensor ISP to the main circuit board MCB.

The electronic device ED further includes an external case EDC that accommodates the display module DM. The external case EDC may be coupled to the window WM to define an outer appearance of the electronic device ED. The external case EDC absorbs an impact applied from the outside, prevents or reduces foreign substances/moisture from penetrating into the display module DM, and thus protects components accommodated in the external case EDC. In some embodiments, as an example of the present disclosure, the external case EDC may be provided in a form in which a plurality of accommodation members are coupled.

The electronic device ED according to some embodiments may further include an electronic module including one or more suitable functional modules for operating the display module DM, a power supply module that supplies power required for an overall operation of the electronic device ED, and a bracket that is coupled to the display module DM and/or the external case EDC to divide an internal space of the electronic device ED.

Figure 3A:
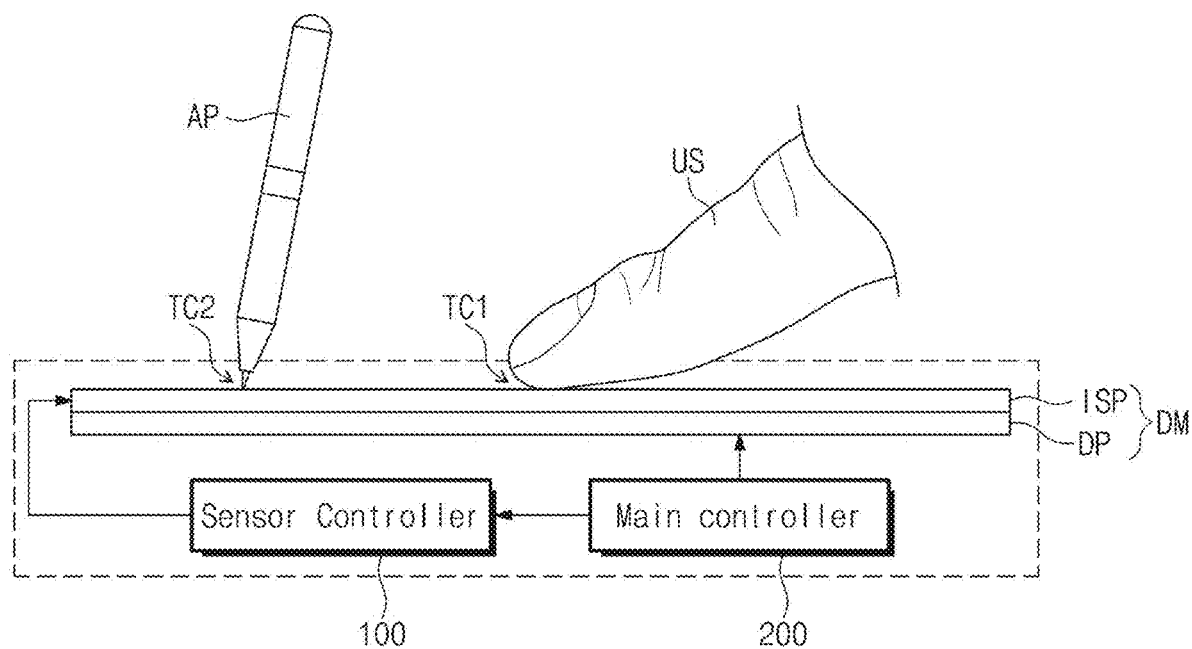
FIG. 3A is a block diagram for describing an operation of the electronic device according to some embodiments of the present disclosure.
Figure 3B:
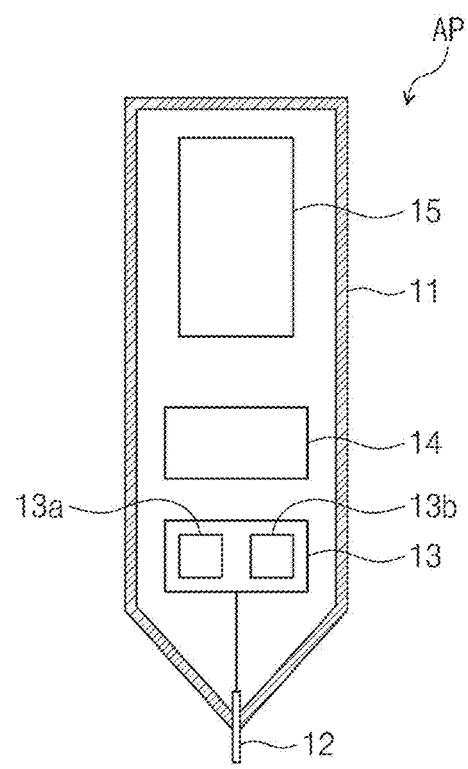
FIG. 3B is a block diagram of an input device illustrated in FIG. 3A.

FIG. 3A is a block diagram for describing an operation of the electronic device according to some embodiments of the present disclosure, and FIG. 3B is a block diagram of an input device illustrated in FIG. 3A.

Referring to FIGS. 3A and 3B, the electronic device ED according to some embodiments of the present disclosure further includes a main controller 200 for controlling driving of the display panel DP and a sensor controller 100 connected to the input sensor ISP. The main controller 200 may control driving of the sensor controller 100 connected to the input sensor ISP. As an example of the present disclosure, the main controller 200 and the sensor controller 100 may be mounted on the main circuit board MCB (illustrated in FIG. 1B). However, as another example, the sensor controller 100 may be embedded in the driving chip DIC (illustrated in FIG. 1B).

The input sensor ISP may include sensing electrodes. A structure of the input sensor ISP will be described below in detail with reference to FIGS. 4A to 14C.

The sensor controller 100 may be connected to the sensing electrodes of the input sensor ISP. The sensor controller 100 may operate the input sensor ISP in the first mode to sense the first input TC1 and operate the input sensor ISP in the second mode to sense the second input TC2.

As illustrated in FIG. 3B, the input device AP may include a housing 11, a conductive tip 12, and a communication module 13. The housing 11 may have a pen shape and have an accommodation space formed therein. The conductive tip 12 may protrude outward from one open side of the housing 11. The conductive tip 12 may be a portion of the input device AP, which is in direct contact with the input sensor ISP.

The communication module 13 may include a transmission circuit 13a and a reception circuit 13b. The transmission circuit 13a may transmit a downlink signal to the sensor controller 100. The downlink signal may include a position of the input device AP, an inclination of the input device AP, status information, and the like. When the input device AP comes into contact with the input sensor ISP, the sensor controller 100 may receive the downlink signal through the input sensor ISP.

The reception circuit 13b may receive an uplink signal from the sensor controller 100. The uplink signal may include panel information, information on a protocol version and the like. The sensor controller 100 may supply the uplink signal to the input sensor ISP, and the input device AP may receive the uplink signal through contact with the input sensor ISP.

The input device AP further includes an input controller 14 that controls an operation of the input device AP. The input controller 14 may be operated according to a regulated program. The transmission circuit 13a receives a signal supplied from the input controller 14 and modulates the received signal into a sensible signal by the input sensor ISP, and the reception circuit 13b modulates the signal received through the input sensor ISP into a processable signal by the input controller 14. The input device AP may further include a power module 15 for supplying power to each component of the input device AP.

Figure 4A:
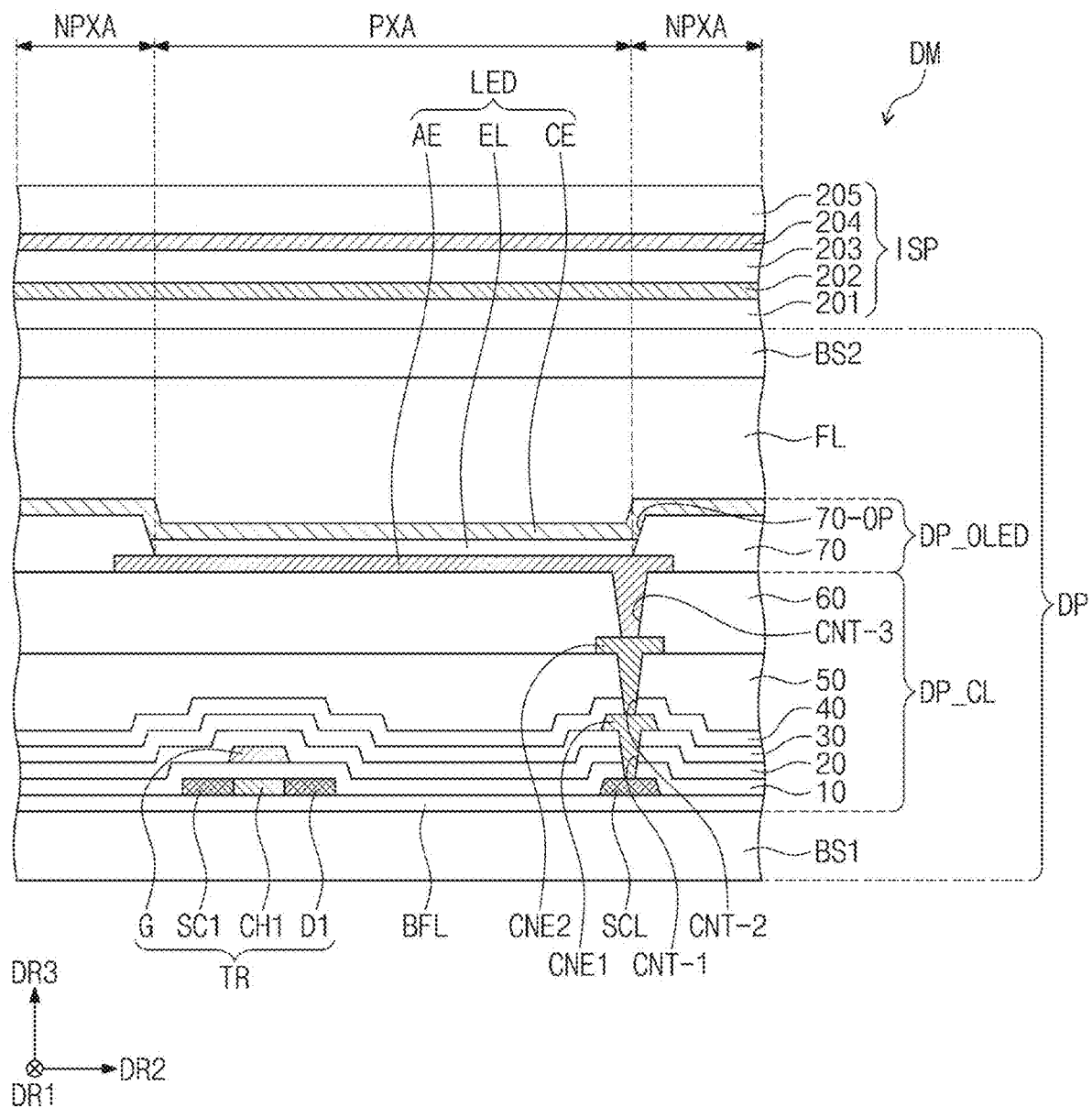
FIG. 4A is a cross-sectional view of a display module according to some embodiments of the present disclosure.
Figure 4B:
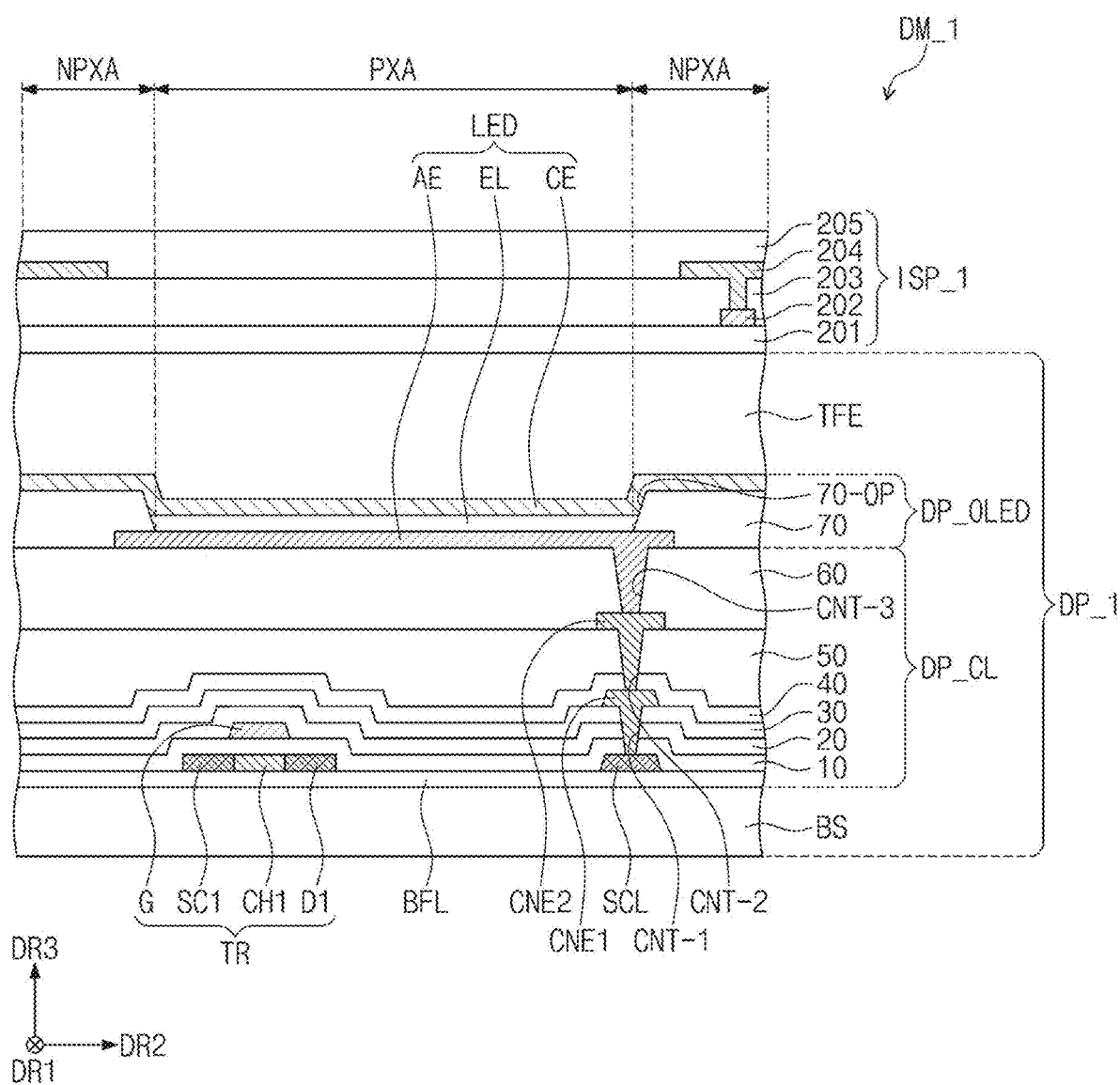
FIG. 4B is a cross-sectional view of the display module according to some embodiments of the present disclosure.

FIGS. 4A and 4B are cross-sectional views of the display module according to some embodiments of the present disclosure.

Referring to FIG. 4A, the display module DM may include the display panel DP and the input sensor ISP. The display panel DP may include a first base layer BS1, a display circuit layer DP_CL, a display element layer DP_OLED, and a second base layer BS2. The input sensor ISP may be disposed on the second base layer BS2.

Each of the first base layer BS1 and the second base layer BS2 may be a laminated structure including a silicon substrate, a plastic substrate, a glass substrate, an insulating film, a plurality of insulating layers, and/or the like.

The display circuit layer DP_CL may be disposed on the first base layer BS1. The display circuit layer DP_CL may include a plurality of insulating layers, a plurality of conductive layers, and a semiconductor layer. The plurality of conductive layers of the display circuit layer DP_CL may constitute signal wiring lines or a control circuit of a pixel.

The display element layer DP_OLED may be disposed on the display circuit layer DP_CL. The display element layer DP_OLED may include light emitting elements. For example, the display element layer DP_OLED may include an organic light emitting diode, an inorganic light emitting diode, a quantum dot, a quantum rod, a micro light emitting diode (LED), a nano LED, and/or the like.

The second base layer BS2 may be disposed on the display element layer DP_OLED. A set (or predetermined) space may be defined between the second base layer BS2 and the display element layer DP_OLED. In some embodiments of the present disclosure, the space may be filled with a filling layer FL such as a silicone-based polymer, an epoxy-based resin, an acryl-based resin, and/or the like. In some embodiments, the space may be filled with air or an inert gas.

In some embodiments, a coupling member may be disposed between the first base layer BS1 and the second base layer BS2. The coupling member may couple the first base layer BS1 and the second base layer BS2. The coupling member may include an organic material such as a photo-curable resin or a photo-plastic resin or include an inorganic material such as a frit seal, but is not limited to an embodiment.

At least one inorganic layer may be formed on an upper surface of the first base layer BS1 in the display panel DP. The inorganic layer may include at least one of an aluminum oxide, a titanium oxide, a silicon oxide, a silicon oxy nitride, a silicon nitride, a zirconium oxide, or a hafnium oxide. The inorganic layer may be formed in multiple layers. The multi-layered inorganic layers may constitute a barrier layer and/or a buffer layer.

A buffer layer BFL may improve (e.g., increase) a bonding force between the first base layer BS1 and a semiconductor pattern. The buffer layer BFL may include a silicon oxide layer and a silicon nitride layer, and the silicon oxide layer and the silicon nitride layer may be alternately laminated.

The semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, an oxide semiconductor, and/or the like.

FIG. 4A merely illustrates a portion of the semiconductor pattern, and the semiconductor pattern may be further disposed in another area. The semiconductor pattern may be disposed across the pixels. The semiconductor pattern may have a different electrical property depending on whether or not the semiconductor pattern is doped. The semiconductor pattern may include a first area having higher conductivity and a second area having lower conductivity. The first area may be doped with an N-type dopant or a P-type dopant. A P-type transistor may include a doped area doped with the P-type dopant, and an N-type transistor may include a doped area doped with the N-type dopant. The second area may be a non-doped area or may be doped at a concentration lower than that of the first area.

A conductivity of the first area is greater than a conductivity of the second area, and the first area may substantially serve as an electrode or a signal line. The second area may substantially correspond to a channel area of a transistor. In other words, a portion of the semiconductor pattern may be a channel part of the transistor, another portion of the semiconductor pattern may be a source or a drain of the transistor, and still another portion of the semiconductor pattern may be a connection electrode or a connection signal line.

Each of pixels may have an equivalent circuit including seven transistors, one capacitor, and a light emitting element, and the equivalent circuit of the pixel may be modified into one or more suitable forms. As an example, FIG. 4A illustrates a pixel including one transistor TR and a light emitting element LED.

The transistor TR may include a source SC1, a channel part CH1, a drain D1, and a gate G. The source SC1, the channel part CH1, and the drain D1 may be formed from the semiconductor pattern. The source SC1 and the drain D1 may generally extend in opposite directions from the channel part CH1 in a cross-sectional view. FIG. 4A illustrates a portion of a connection signal line SCL formed from the semiconductor pattern. In some embodiments, the connection signal line SCL may be electrically connected to the drain D1 of the transistor TR on a plane (e.g., in a plan view).

A first insulating layer 10 may be disposed on the buffer layer BFL. The first insulating layer 10 may commonly overlap the plurality of pixels and cover the semiconductor pattern. The first insulating layer 10 may be an inorganic layer and/or an organic layer and may have a single-layer structure or a multi-layer structure. The first insulating layer 10 may include at least one of an aluminum oxide, a titanium oxide, a silicon oxide, a silicon nitride, a silicon oxy nitride, a zirconium oxide, or a hafnium oxide. In some embodiments, the first insulating layer 10 may be a single-layered silicon oxide layer. Insulating layers of the display circuit layer DP_CL, which will be described in more detail below, as well as the first insulating layer 10 may be an inorganic layer and/or an organic layer, and may have a single-layer structure or a multi-layer structure. The inorganic layer may include at least one of the above-described materials, but the present disclosure is not limited thereto.

The gate G is disposed on the first insulating layer 10. The gate G may be a portion of a metal pattern. The gate G overlaps the channel part CH1 in a third direction DR3. The gate G may function as a mask in a process of doping the semiconductor pattern.

A second insulating layer 20 may be disposed on the first insulating layer 10 and cover the gate G. The second insulating layer 20 may commonly overlap the pixels PX. The second insulating layer 20 may be an inorganic layer and/or an organic layer and may have a single-layer structure or a multi-layer structure. The second insulating layer 20 may include at least one of a silicon oxide, a silicon nitride, or a silicon oxy nitride. In some embodiments, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through the first insulating layer 10, the second insulating layer 20, and the third insulating layer 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

The display element layer DP_OLED may be disposed on the display circuit layer DP_CL. The display element layer DP_OLED may include the light emitting element LED and a pixel defining film 70. For example, the display element layer DP_OLED may include an organic light emitting material, an inorganic light emitting material, a quantum dot, a quantum rod, a micro LED, a nano LED, and/or the like. Hereinafter, it will be described that the light emitting element LED is an organic light emitting element, but the present disclosure is not particularly limited thereto.

The light emitting element LED may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 passing through the sixth insulating layer 60.

The pixel defining film 70 may be disposed on the sixth insulating layer 60 and cover a portion of the first electrode AE. An opening 70-OP is defined in the pixel defining film 70. The opening 70-OP of the pixel defining film 70 exposes at least a portion of the first electrode AE.

The active area AA (see, e.g., FIG. 1B) may include a light emitting area PXA and a non-light emitting area NPXA adjacent to the light emitting area PXA. The non-light emitting area NPXA may surround the light emitting area PXA. In some embodiments, the light emitting area PXA is defined to correspond to a partial area of the first electrode AE, which is exposed by the opening 70-OP.

The light emitting layer EL may be disposed on the first electrode AE. The light emitting layer EL may be disposed in an area corresponding to the opening 70-OP. For example, the light emitting layers EL may be formed separately from the respective pixels. When the light emitting layers EL are formed separately from the respective pixels, each of the light emitting layers EL may be configured to emit a light having at least one of a blue color, a red color, or a green color. However, the present disclosure is not limited thereto, and the light emitting layer EL may be connected to the pixels and may be provided commonly. In this case, the light emitting layer EL may provide a blue light or a white light.

The second electrode CE may be disposed on the light emitting layer EL. The second electrode CE may have an integral shape and may be commonly disposed in the plurality of pixels.

In some embodiments, a hole control layer may be disposed between the first electrode AE and the light emitting layer EL. The hole control layer may be commonly disposed in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer.

The hole control layer and the electron control layer may be commonly formed in the plurality of pixels by using an open mask.

The second base layer BS2 may be disposed on the display element layer DP_OLED. As an example of the present disclosure, the first and second base layers BS1 and BS2 may be of a rigid type.

The filling layer FL may be disposed between the first and second base layers BS1 and BS2. The filling layer FL may be disposed in a space sealed by a coupling member between the first and second base layers BS1 and BS2. The filling layer FL may include a thermosetting material. The input sensor ISP may be directly disposed on the display panel DP. For example, the input sensor ISP may be directly disposed on the second base layer BS2.

The input sensor ISP may include a plurality of insulating layers and a plurality of conductive layers. The plurality of conductive layers may constitute sensing electrodes that sense external inputs, sensing wiring lines electrically connected to the sensing electrodes, and sensing pads electrically connected to the sensing wiring lines. The input sensor ISP may include a base insulating layer 201, a first conductive layer 202, a sensing insulating layer 203, a second conductive layer 204, and a cover insulating layer 205.

The base insulating layer 201 may be an inorganic layer including at least one of a silicon nitride, a silicon oxy nitride, or a silicon oxide. In some embodiments, the base insulating layer 201 may be an organic layer including an epoxy resin, an acrylic resin, an imide-based resin, and/or the like. The base insulating layer 201 may have a single-layer structure or have a multi-layer structure in which layers are laminated in the third direction DR3.

Each of the first conductive layer 202 and the second conductive layer 204 may have a single-layer structure or have a multi-layer structure in which layers are laminated in the third direction DR3. According to some embodiments of the present disclosure, each of the first conductive layer 202 and the second conductive layer 204 may overlap the light emitting area PXA in the third direction DR3. In this case, each of the first conductive layer 202 and the second conductive layer 204 may include a transparent conductive layer. For example, the transparent conductive layer may include a transparent conductive oxide such as an indium tin oxide (ITO), an indium zinc oxide (IZO), a zinc oxide (ZnO), an indium zinc tin oxide (IZTO), and/or the like. In some embodiments, the transparent conductive layer may include a conductive polymer such as poly(3,4-ethylenedioxythiophene) (PEDOT), metal nanowire, graphene, and/or the like.

The conductive layer having a multi-layer structure may include metal layers. The metal layers may have, for example, a three-layer structure of titanium/aluminum/titanium. The conductive layer having a multi-layer structure may include at least one metal layer and at least one transparent conductive layer.

At least one of the sensing insulating layer 203 or the cover insulating layer 205 may include an inorganic film. The inorganic film may include at least one of an aluminum oxide, a titanium oxide, a silicon oxide, a silicon nitride, a silicon oxy nitride, a zirconium oxide, or a hafnium oxide.

At least one of the sensing insulating layer 203 or the cover insulating layer 205 may include an organic film. The organic film may include at least one of an acryl-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Referring to FIG. 4B, a display module DM_1 may include a display panel DP_1 and an input sensor ISP_1. The display panel DP_1 may include the base layer BS, the display circuit layer DP_CL, the display element layer DP_OLED, and an encapsulation layer TFE. The base layer BS may be of a flexible type. The input sensor ISP_1 may be disposed on the encapsulation layer TFE. According to some embodiments of the present disclosure, the display panel DP_1 and the input sensor ISP_1 may be formed through a continuous process. For example, the input sensor ISP_1 may be directly formed on the encapsulation layer TFE.

The encapsulation layer TFE may be disposed on the display element layer DP_OLED. The encapsulation layer TFE may include an inorganic layer, an organic layer, and an inorganic layer that are sequentially laminated, but layers constituting the encapsulation layer TFE are not limited thereto.

The inorganic layers may protect the display element layer DP_OLED from moisture and oxygen, and the organic layer may protect the display element layer DP_OLED from foreign substances such as dust particles. The inorganic layers may include a silicon nitride layer, a silicon oxy nitride layer, a silicon oxide layer, a titanium oxide layer, an aluminum oxide layer, and/or the like. The organic layer may include an acryl-based organic layer, and the present disclosure is not limited thereto.

The input sensor ISP_1 may be formed on the display panel DP_1 through a continuous process. In this case, it may be expressed that the input sensor ISP_1 is directly disposed on the display panel DP_1. The wording "directly disposed" may mean that a third component is not disposed between the input sensor ISP_1 and the display panel DP_1. For example, a separate adhesive member or a separate coupling member may not be disposed between the input sensor ISP_1 and the display panel DP_1. In some embodiments, the input sensor ISP_1 may be coupled to the display panel DP_1 through the adhesive member or the coupling member. The adhesive member may include a general adhesive or a pressure-sensitive adhesive.

The input sensor ISP_1 may include the base insulating layer 201, the first conductive layer 202, the sensing insulating layer 203, the second conductive layer 204, and the cover insulating layer 205.

Each of the first conductive layer 202 and the second conductive layer 204 may have a single-layer structure or have a multi-layer structure in which layers are laminated in the third direction DR3. The conductive layer having the single-layer structure may include a metal layer or a transparent conductive layer. The metal layer may include molybdenum, silver, titanium, copper, aluminum, or alloys thereof. The transparent conductive layer may include a transparent conductive oxide such as an indium tin oxide (ITO), an indium a zinc oxide (IZO), a zinc oxide (ZnO), an indium zinc tin oxide (IZTO), and/or the like. In some embodiments, the transparent conductive layer may include a conductive polymer such as poly(3,4-ethylenedioxythiophene) (PEDOT), metal nanowire, graphene, and/or the like.

The conductive layer having a multi-layer structure may include metal layers. The metal layers may have, for example, a three-layer structure of titanium/aluminum/titanium. The conductive layer having a multi-layer structure may include at least one metal layer and at least one transparent conductive layer.

Figure 5:
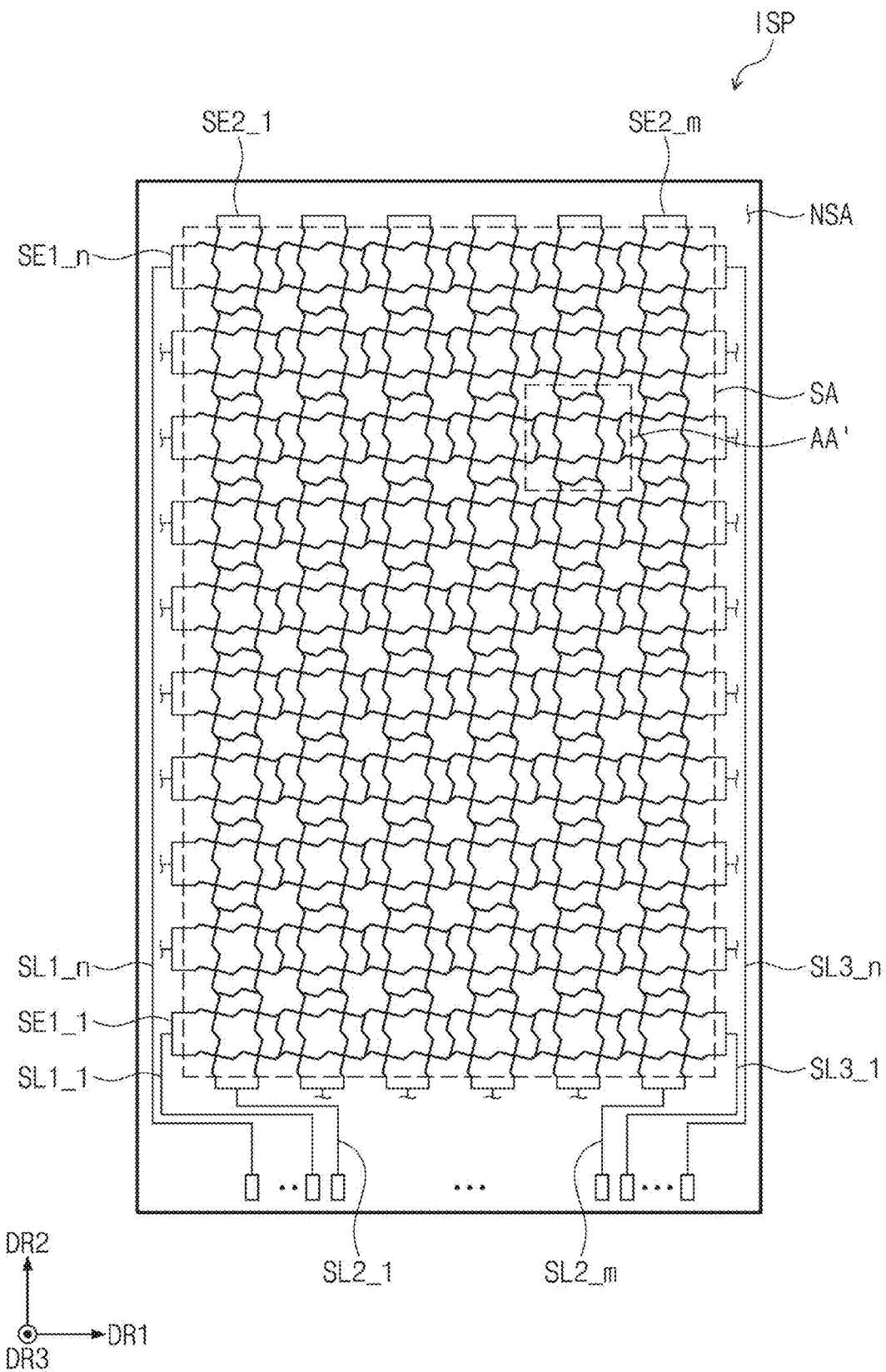
FIG. 5 is a plan view illustrating an input sensor according to some embodiments of the present disclosure.
Figure 6:
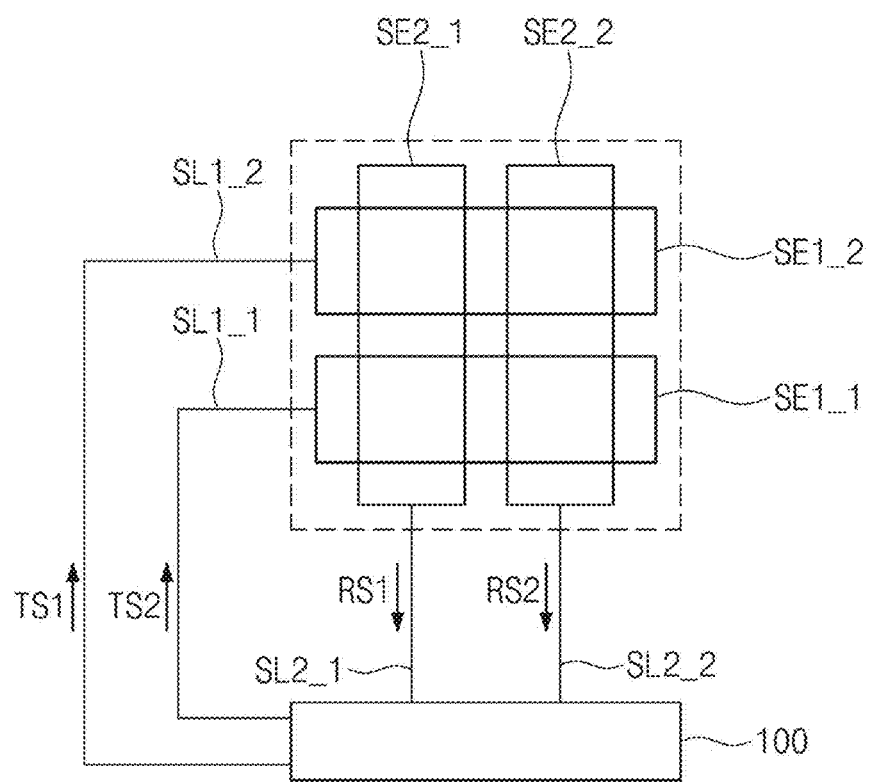
FIG. 6 is a view for describing an operation of the input sensor in a first mode.
Figure 7B:
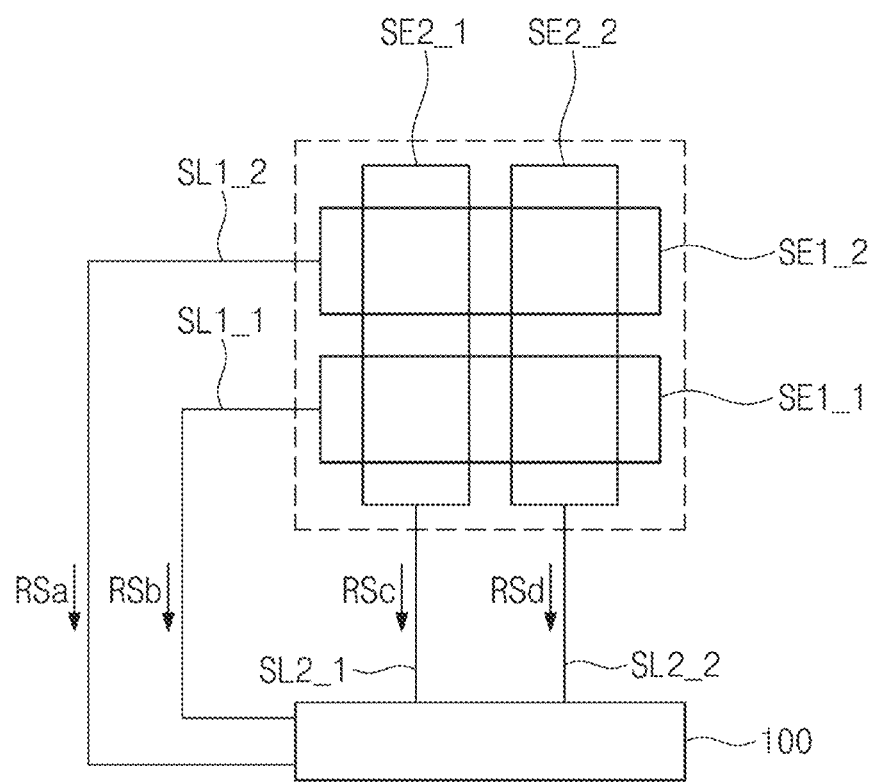

FIG. 5 is a plan view illustrating the input sensor according to some embodiments of the present disclosure. FIG. 6 is a view for describing an operation of the input sensor in a first mode. FIGS. 7A and 7B are views for describing the operation of the input sensor in a second mode.

Referring to FIG. 5, the input sensor ISP may include a sensing area SA and a non-sensing area NSA. The sensing area SA may be an area that is activated according to an electric signal. For example, the sensing area SA may be an area that senses an input. The non-sensing area NSA may surround the sensing area SA.

The input sensor ISP includes first sensing electrodes SE1_1 to SE1_n and second sensing electrodes SE2_1 to SE2_m. The first sensing electrodes SE1_1 to SE1_n and the second sensing electrodes SE2_1 to SE2_m are electrically insulated from each other and cross each other. As an example of the present disclosure, the first sensing electrodes SE1_1 to SE1_n include "n" first sensing electrodes SE1_1 to SE1_n, and the second sensing electrodes SE2_1 to SE2_m include "m" second sensing electrodes SE2_1 to SE2_m. Here, "n" and "m" are natural numbers greater than or equal to 1. "n" may be an integer greater than "m", but the present disclosure is not limited thereto. For example, "n" may be an integer that is less than or equal to "m".

Unlike the illustration, each of the first sensing electrodes SE1_1 to SE1_n may generally extend in the first direction DR1 and have a bar shape. In this case, the first sensing electrodes SE1_1 to SE1_n may be spaced apart from each other in the second direction DR2. The first sensing electrodes SE1_1 to SE1_n may have the same or substantially the same electrode width in the second direction DR2. A separation distance between the first sensing electrodes SE1_1 to SE1_n in the second direction DR2 may be constant or substantially constant. Further, each of the second sensing electrodes SE2_1 to SE2_m may generally extend in the second direction DR2 and have a bar shape. The second sensing electrodes SE2_1 to SE2_m may be spaced apart from each other in the first direction DR1. The second sensing electrodes SE2_1 to SE2_m may have the same or substantially the same electrode width in the first direction DR1. A separation distance between the second sensing electrodes SE2_1 to SE2_m in the first direction DR1 may be constant or substantially constant.

The first sensing electrodes SE1_1 to SE1_n and the second sensing electrodes SE2_1 to SE2_m may cross each other. The first sensing electrodes SE1_1 to SE1_n may be electrically separated from each other, and the second sensing electrodes SE2_1 to SE2_m may be electrically separated from each other.

The input sensor ISP may operate in the first mode in which information on an external input is acquired through a change in a mutual capacitance between the first sensing electrodes SE1_1 to SE1_n and the second sensing electrodes SE2_1 to SE2_m or in the second mode in which an input by the input device AP (see, e.g., FIG. 3A) is sensed through changes in capacitances of the first sensing electrodes SE1_1 to SE1_n and the second sensing electrodes SE2_1 to SE2_m.

The input sensor ISP may further include a plurality of first sensing lines SL1_1 to SL1_n and a plurality of second sensing lines SL2_1 to SL2_m. The first and second sensing electrodes SE1_1 to SE1_n and SE2_1 to SE2_m may be arranged in the sensing area SA. The first and second sensing lines SL1_1 to SL1_n and SL2_1 to SL2_m may be arranged in the non-sensing area NSA. The plurality of first sensing lines SL1_1 to SL1_n are electrically connected to one sides of the first sensing electrodes SE1_1 to SE1_n, and the plurality of second sensing lines SL2_1 to SL2_m are electrically connected to one sides of the second sensing electrodes SE2_1 to SE2_m. As an example of the present disclosure, the input sensor ISP may further include third sensing lines SL3_1 to SL3_n electrically connected to one sides of the first sensing electrodes SE1_1 to SE1_n. However, the present disclosure is not limited thereto. For example, the third sensing lines SL3_1 to SL3_n may not be provided.

The first sensing electrodes SE1_1 to SE1_n are electrically connected to the sensor controller 100 (see, e.g., FIG. 3A) through the plurality of first sensing lines SL1_1 to SL1_n, and the second sensing electrodes SE2_1 to SE2_m are electrically connected to the sensor controller 100 (see, e.g., FIG. 3A) through the plurality of second sensing lines SL2_1 to SL2_m.

FIGS. 6 to 7B schematically illustrate some of the first sensing electrodes SE1_1 to SE1_n and some of the second sensing electrodes SE2_1 to SE2_m illustrated in FIG. 5.

Referring to FIGS. 3A, 5, and 6, in the first mode, the first sensing electrodes SE1_1 to SE1_n may operate as transmission electrodes, and the second sensing electrodes SE2_1 to SE2_m may operate as reception electrodes. For example, the first sensing electrodes SE1_1 to SE1_n may be referred to as transmission electrodes, and the second sensing electrodes SE2_1 to SE2_m may be referred to as reception electrodes. In the first mode, the sensor controller 100 may sense an external input by sensing a change in a mutual capacitance formed between the first sensing electrodes SE1_1 to SE1_n and the second sensing electrodes SE2_1 to SE2_m.

In the first mode, the sensor controller 100 may provide driving signals TS1 and TS2 to the first sensing electrodes SE1_1 to SE1_n. In the first mode, the sensor controller 100 may receive sensing signals RS1 and RS2 from the second sensing electrodes SE2_1 to SE2_m. Thus, the sensor controller 100 may compare the driving signals TS1 and TS2 with the sensing signals RS1 and RS2 corresponding thereto and may generate coordinate values for a position in which the first input TC1 is provided based on the amount of change therein.

Referring to FIGS. 3A, 5, 7A, and 7B, when the input device AP approaches the input sensor ISP, the input sensor ISP may enter the second mode for sensing the second input TC2. The input device AP may transmit and receive data to and from the sensor controller 100 through the input sensor ISP.

In the second mode, the first sensing electrodes SE1_1 to SE1_n and the second sensing electrodes SE2_1 to SE2_m may be utilized as transmission electrodes for providing, to the input device AP, uplink signals TSa, TSb, TSc, and TSd provided from the sensor controller 100. In the second mode, the first sensing electrodes SE1_1 to SE1_n and the second sensing electrodes SE2_1 to SE2_m may be utilized as reception electrodes for providing, to the sensor controller 100, downlink signals RSa, RSb, RSc, and RSd provided from the input device AP. For example, in the second mode, all the first sensing electrodes SE1_1 to SE1_n and the second sensing electrodes SE2_1 to SE2_m may be utilized as the transmission electrodes or may be utilized as the reception electrodes.

Figure 8:
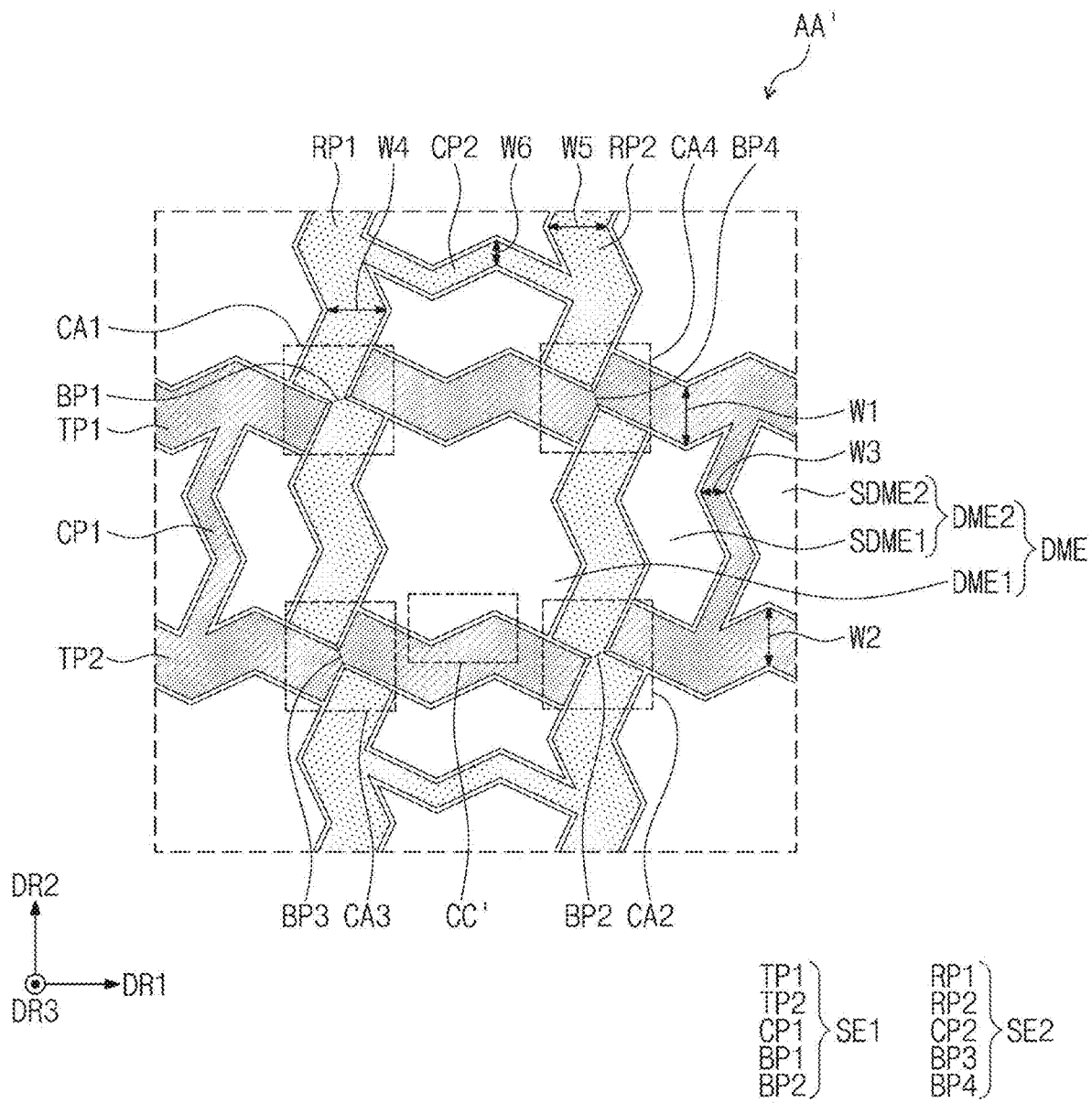
FIG. 8 is an enlarged view of area AA' illustrated in FIG. 5.
Figure 9A:
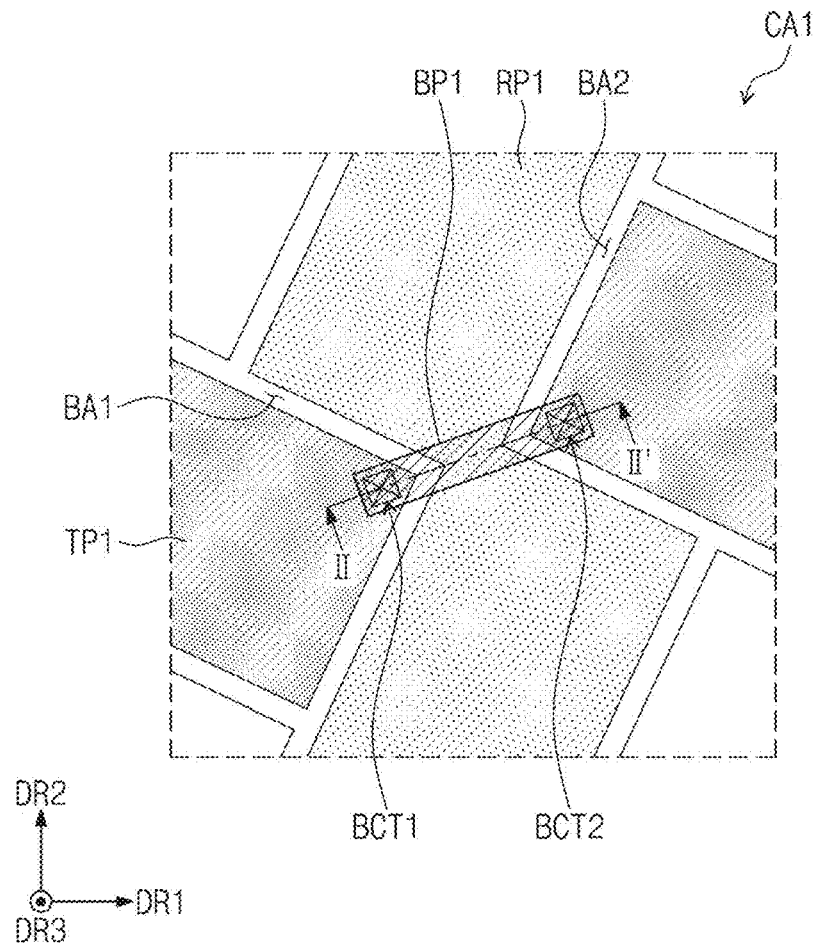
FIG. 9A is an enlarged view of a first cross area illustrated in FIG. 8.
Figure 9B:
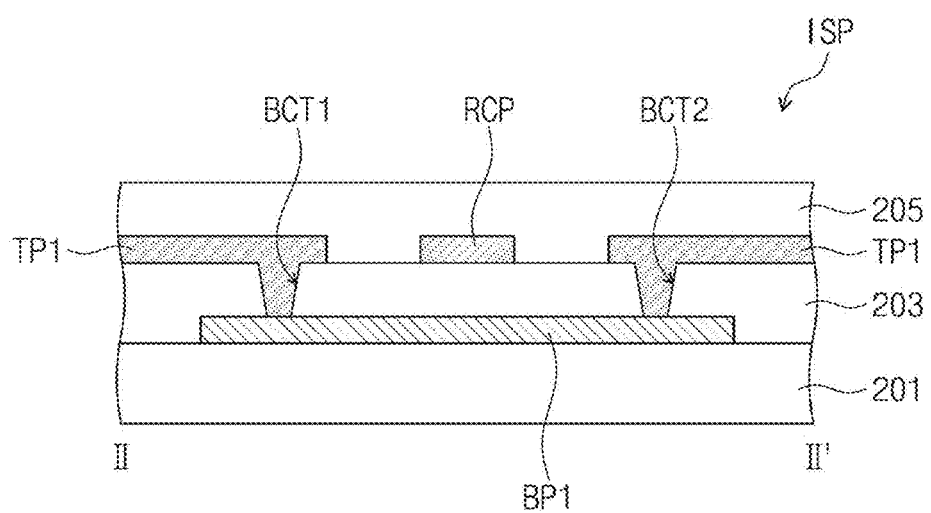
FIG. 9B is a cross-sectional view of the input sensor along line II-II' illustrated in FIG. 9A according to some embodiments of the present disclosure.

FIG. 8 is an enlarged view of area AA' illustrated in FIG. 5, and FIG. 9A is an enlarged view of a first cross area illustrated in FIG. 8. FIG. 9B is a cross-sectional view of the input sensor along line II-II' illustrated in FIG. 9A according to some embodiments of the present disclosure. FIG. 8 illustrates the first sensing electrode SE1 and the second sensing electrode SE2. The first sensing electrode SE1 may be any one of the first sensing electrodes SE1_1 to SE1_n illustrated in FIG. 5, and the second sensing electrode SE2 may be any one of the second sensing electrodes SE2_1 to SE2_m.

Referring to FIG. 8, the first sensing electrode SE1 may include a first transmission pattern TP1, a second transmission pattern TP2, and a first connection pattern CP1 that electrically connects the first transmission pattern TP1 and the second transmission pattern TP2.

A plurality of first transmission patterns TP1 may be provided. The first transmission patterns TP1 may be arranged in the first direction DR1. The first transmission patterns TP1 may generally extend in the first direction DR1 and have a zigzag shape. The second transmission pattern TP2 may be spaced apart from the first transmission pattern TP1 in the second direction DR2. A plurality of second transmission patterns TP2 may be provided to correspond to the first transmission patterns TP1. The second transmission patterns TP2 may generally extend in the first direction DR1 and have a zigzag shape.

The first connection pattern CP1 may electrically connect at least one of the first transmission patterns TP1 and at least one of the second transmission patterns TP2 to each other. The first connection pattern CP1 may be a pattern that connects a center of one of the first transmission patterns TP1 and a center of one of the second transmission patterns TP2, which corresponds to the one of the first transmission patterns TP1. The first connection pattern CP1 may generally extend in the second direction DR2 and have a zigzag shape. A plurality of first connection patterns CP1 may be provided. The first connection pattern CP1 may generally extend from the one of the first transmission patterns TP1 and the one of the second transmission patterns TP2, which corresponds to the one of the first transmission patterns TP1, and may be provided integrally with the one of the first transmission patterns TP1 and the one of the second transmission patterns TP2.

A width W1 of the first transmission patterns TP1 in the second direction DR2 may be the same or substantially the same as a width W2 of the second transmission patterns TP2 in the second direction DR2. The width W1 of the first transmission patterns TP1 and the width W2 of the second transmission patterns TP2 may be constant or substantially constant in the first direction DR1. According to an embodiment of the present disclosure, a width W3 of the first connection pattern CP1 in the first direction DR1 may be smaller than the width W1 of the first transmission patterns TP1 and the width W2 of the second transmission patterns TP2. However, the present disclosure is not limited thereto, and the width W3 of the first connection pattern CP1 in the first direction DR1 may be the same or substantially the same as or greater than the width W1 of the first transmission patterns TP1 and the width W2 of the second transmission patterns TP2.

The second sensing electrode SE2 may include a first reception pattern RP1, a second reception pattern RP2, and a second connection pattern CP2 that electrically connects the first reception pattern RP1 and the second reception pattern RP2.

A plurality of first reception patterns RP1 may be provided. The first reception patterns RP1 may be arranged in the second direction DR2. The first reception patterns RP1 may generally extend in the second direction DR2 and have a zigzag shape. The second reception pattern RP2 may be spaced apart from the first reception patterns RP1 in the first direction DR1. A plurality of second reception patterns RP2 may be provided to correspond to the first reception patterns RP1. For example, the first reception patterns RP1 and the second reception patterns RP2 may be arranged in a one-to-one correspondence. The second reception patterns RP2 may generally extend in the first direction DR1 and have a zigzag shape.

The second connection pattern CP2 may electrically connect at least one of the first reception patterns RP1 and at least one of the second reception patterns RP2 to each other. The second connection pattern CP2 may be a pattern that connects a center of one of the first reception patterns RP1 and a center of one of the second reception patterns RP2, which corresponds to the one of the first reception patterns RP1. The second connection pattern CP2 may generally extend in the first direction DR1 and have a zigzag shape. A plurality of second connection patterns CP2 may be provided. The second connection pattern CP2 may generally extend from the one of the first reception patterns RP1 and the one of the second reception patterns RP2, which corresponds to the one of the first reception patterns RP1, and may be provided integrally with the one of the first reception patterns RP1 and the one of the second reception patterns RP2.

A width W4 of the first reception patterns RP1 in the first direction DR1 may be the same or substantially the same as a width W5 of the second reception patterns RP2 in the first direction DR1. The width W4 of the first reception patterns RP1 and the width W5 of the second reception patterns RP2 may be constant or substantially constant in the second direction DR2. According to some embodiments of the present disclosure, a width W6 of the second connection pattern CP2 in the second direction DR2 may be smaller than the width W4 of the first reception patterns RP1 and the width W5 of the second reception patterns RP2. However, the present disclosure is not limited thereto, and the width W6 of the second connection pattern CP2 in the second direction DR2 may be the same as or substantially the same as, or greater than the width W4 of the first reception patterns RP1 and the width W5 of the second reception patterns RP2. The width W3 of the first connection pattern CP1 and the width W6 of the second connection pattern CP2 may be the same or substantially the same.

According to some embodiments of the present disclosure, the first sensing electrode SE1 may further include a first bridge pattern BP1 that electrically connects the first transmission patterns TP1 spaced apart from each other in the first direction DR1 and a second bridge pattern BP2 that electrically connects the second transmission patterns TP2 spaced apart from each other in the first direction DR1. The first bridge pattern BP1 and the second bridge pattern BP2 may be diagonally arranged in the first direction DR1 and the second direction DR2.

A plurality of first bridge patterns BP1 may be provided, and a plurality of second bridge patterns BP2 may be provided. The first bridge patterns BP1 and the second bridge patterns BP2 included in the first sensing electrode SE1 generally extending in the first direction DR1 may be arranged to alternate with each other in the first direction DR1.

According to some embodiments of the present disclosure, the second sensing electrode SE2 may further include a third bridge pattern BP3 that electrically connects the first reception patterns RP1 spaced apart from each other in the second direction DR2 and a fourth bridge pattern BP4 that electrically connects the second reception patterns RP2 spaced apart from each other in the second direction DR2. The third bridge pattern BP3 and the fourth bridge pattern BP4 may be diagonally arranged in the first direction DR1 and the second direction DR2.

A plurality of third bridge patterns BP3 may be provided, and a plurality of fourth bridge patterns BP4 may be provided. The third bridge patterns BP3 and the fourth bridge patterns BP4 included in the second sensing electrode SE2 generally extending in the second direction DR2 may be arranged to alternate with each other in the second direction DR2.

According to some embodiments of the present disclosure, the first sensing electrode SE1 may include the first connection patterns CP1 that electrically connect the first transmission patterns TP1 and the second transmission patterns TP2, and the second sensing electrode SE2 may include the second connection patterns CP2 that electrically connect the first reception patterns RP1 and the second reception patterns RP2. As a result, when the input sensor ISP (see, e.g., FIG. 5) is manufactured, and when the first transmission patterns TP1 arranged in the first direction DR1 and adjacent to each other are electrically separated from each other or the second transmission patterns TP2 arranged in the first direction DR1 and adjacent to each other are electrically separated from each other due to scratches, the first transmission patterns TP1 or the second transmission patterns TP2 may be prevented from floating by the first connection patterns CP1, or instances thereof may be substantially reduced.

Likewise, when the input sensor ISP (see, e.g., FIG. 5) is manufactured, and when the first reception patterns RP1 arranged in the second direction DR2 and adjacent to each other are electrically separated from each other or the second reception patterns RP2 arranged in the second direction DR2 and adjacent to each other are electrically separated from each other due to scratches, the first reception patterns RP1 or the second reception patterns RP2 may be prevented from floating by the second connection patterns CP2, or instances thereof may be substantially reduced.

The input sensor ISP (see, e.g., FIG. 5) may further include a plurality of dummy electrodes DME arranged between the first sensing electrode SE1 and the second sensing electrode SE2. For example, the dummy electrodes DME may be surrounded by the first transmission patterns TP1, the second transmission patterns TP2, the first reception patterns RP1, and the second reception patterns RP2. In more detail, one of the dummy electrodes DME may be surrounded by one of the first transmission patterns TP1, one of the second transmission patterns TP2, one of the first reception patterns RP1, and one of the second reception patterns RP2, which correspond to the one of the dummy electrodes DME. The dummy electrodes DME may include the same or substantially the same material as that of the first sensing electrode SE1 and the second sensing electrode SE2. For example, the dummy electrodes DME may include a transparent conductive layer. For example, the transparent conductive layer may include a transparent conductive oxide such as an indium tin oxide (ITO), an indium zinc oxide (IZO), a zinc oxide (ZnO), an indium zinc tin oxide (IZTO), and/or the like. In some embodiments, the transparent conductive layer may include a conductive polymer such as poly(3,4-ethylenedioxythiophene) (PEDOT), metal nanowire, graphene, and/or the like. Because the dummy electrodes DME are arranged between the first sensing electrode SE1 and the second sensing electrode SE2, uniform transmittance is achieved, and thus a problem of, a boundary area between the first sensing electrode SE1 and the second sensing electrode SE2, being visually recognized may be reduced.

According to some embodiments of the present disclosure, a side surface of each of the dummy electrodes DME may have a zigzag shape. For example, the side surface of each of the dummy electrodes DME may have a zigzag shape to correspond to the shapes of the first transmission patterns TP1, the second transmission patterns TP2, the first reception patterns RP1, and the second reception patterns RP2 that surround the dummy electrodes DME. The dummy electrodes DME may be spaced apart by the same or substantially the same distance from the first transmission patterns TP1, the second transmission patterns TP2, the first reception patterns RP1, and the second reception patterns RP2. For example, the dummy electrodes DME, which are floating electrodes, may be electrically insulated from the first transmission patterns TP1, the second transmission patterns TP2, the first reception patterns RP1, and the second reception patterns RP2.

The dummy electrodes DME may include a first dummy electrode DME1 that is not separated by the first connection patterns CP1 or the second connection patterns CP2 and a second dummy electrode DME2 that is separated by the first connection patterns CP1 or the second connection patterns CP2. For example, the second dummy electrode DME2 may include a first sub-dummy electrode SDME1 and a second sub-dummy electrode SDME2 that are separated by the first connection patterns CP1 or the second connection patterns CP2.

The first sub-dummy electrode SDME1 and the second sub-dummy electrode SDME2 may be separated and electrically insulated from each other. Side surfaces of the first sub-dummy electrode SDME1 and the second sub-dummy electrode SDME2 may have a zigzag shape. The side surfaces of the first sub-dummy electrode SDME1 and the second sub-dummy electrode SDME2 may have a zigzag shape to correspond to the shapes of the first connection patterns CP1 or the second connection patterns CP2 that are adjacent to the first sub-dummy electrode SDME1 and the second sub-dummy electrode SDME2. The first sub-dummy electrode SDME1 and the second sub-dummy electrode SDME2 may be electrically insulated from the first connection patterns CP1 and the second connection patterns CP2.

According to some embodiments of the present disclosure, at least one dummy electrode DME may be disposed between two first connection patterns CP1 adjacent to each other in the first direction DR1 among the first connection patterns CP1, and at least one dummy electrode DME may be disposed between two second connection patterns CP2 adjacent to each other in the second direction DR2 among the second connection patterns CP2. In more detail, the first sub-dummy electrode SDME1, the second sub-dummy electrode SDME2, and the first dummy electrode DME1 positioned between the first sub-dummy electrode SDME1 and the second sub-dummy electrode SDME2 are arranged between the two first connection patterns CP1 adjacent to each other in the first direction DR1 among the first connection patterns CP1. The first sub-dummy electrode SDME1, the second sub-dummy electrode SDME2, and the first dummy electrode DME1 positioned between the first sub-dummy electrode SDME1 and the second sub-dummy electrode SDME2 may be arranged between the two second connection patterns CP2 adjacent to each other in the second direction DR2 among the second connection patterns CP2.

Referring to FIGS. 8 and 9A, the input sensor ISP (see, e.g., FIG. 5) may be provided with first to fourth cross areas CA1, CA2, CA3, and CA4. The first cross area CA1 may be defined as an area in which the first transmission patterns TP1 and the first reception patterns RP1 cross each other. The second cross area CA2 is defined as an area in which the second transmission patterns TP2 and the second reception patterns RP2 cross each other, and the third cross area CA3 is defined as an area in which the second transmission patterns TP2 and the first reception patterns RP1 cross each other. The fourth cross area CA4 is defined as an area in which the first transmission patterns TP1 and the second reception patterns RP2 cross each other. The first bridge pattern BP1 may be disposed in the first cross area CA1, the second bridge pattern BP2 may be disposed in the second cross area CA2, the third bridge pattern BP3 may be disposed in the third cross area CA3, and the fourth bridge pattern BP4 may be disposed in the fourth cross area CA4.

According to some embodiments of the present disclosure, the first cross area CA1 may include a plurality of boundary areas BA1 and BA2 in which one surface of the first transmission patterns TP1 and one surface of the first reception patterns RP1 face each other. For example, in the first cross area CA1, the one surface of the first transmission patterns TP1 and the one surface of the first reception patterns RP1 face each other, and thus the first transmission patterns TP1 and the first reception patterns RP1 may be spaced apart by a constant or substantially constant interval from each other. The second cross area CA2 may include a plurality of boundary areas in which one surface of the second transmission patterns TP2 and one surface of the second reception patterns RP2 face each other, the third cross area CA3 may include a plurality of boundary areas in which the one surface of the second transmission patterns TP2 and the one surface of the first reception patterns RP1 face each other, and the fourth cross area CA4 may include a plurality of boundary areas in which the one surface of the first transmission patterns TP1 and the one surface of the second reception patterns RP2 face each other.

Referring to FIGS. 9A and 9B, the first bridge pattern BP1 may overlap the first reception patterns RP1 on a plane (e.g., in a plan view). In more detail, the first bridge pattern BP1 may overlap a reception connection pattern RCP that connects the first reception patterns RP1 on a plane (e.g., in a plan view). According to some embodiments of the present disclosure, the first bridge pattern BP1 may be disposed on the base insulating layer 201. The sensing insulating layer 203 may be provided with first and second bridge contact holes BCT1 and BCT2 through which the first bridge pattern BP1 is exposed. The first transmission patterns TP1 may be electrically connected to each other through the first and second bridge contact holes BCT1 and BCT2.

The first bridge pattern BP1 may be disposed on a different layer from those of the first transmission patterns TP1 and the first reception patterns RP1. FIG. 9B illustrates a structure in which the first transmission patterns TP1 and the first reception patterns RP1 are arranged on the sensing insulating layer 203 and the first bridge pattern BP1 is disposed on the base insulating layer 201, but the present disclosure is not limited thereto. For example, the first transmission patterns TP1 and the first reception patterns RP1 may be arranged on the sensing insulating layer 203, and the first bridge pattern BP1 may be disposed on the sensing insulating layer 203.

FIGS. 9A and 9B illustrate only the first bridge pattern BP1, but the description of the first bridge pattern BP1 may be equally applied to the second to fourth bridge patterns BP2, BP3, and BP4 (see, e.g., FIG. 8). For example, the second to fourth bridge patterns BP2, BP3, and BP4 are arranged on the base insulating layer 201, and the first transmission patterns TP1, the second transmission patterns TP2, the first reception patterns RP1, and the second reception patterns RP2 may be arranged on the sensing insulating layer 203.

Figure 10A:
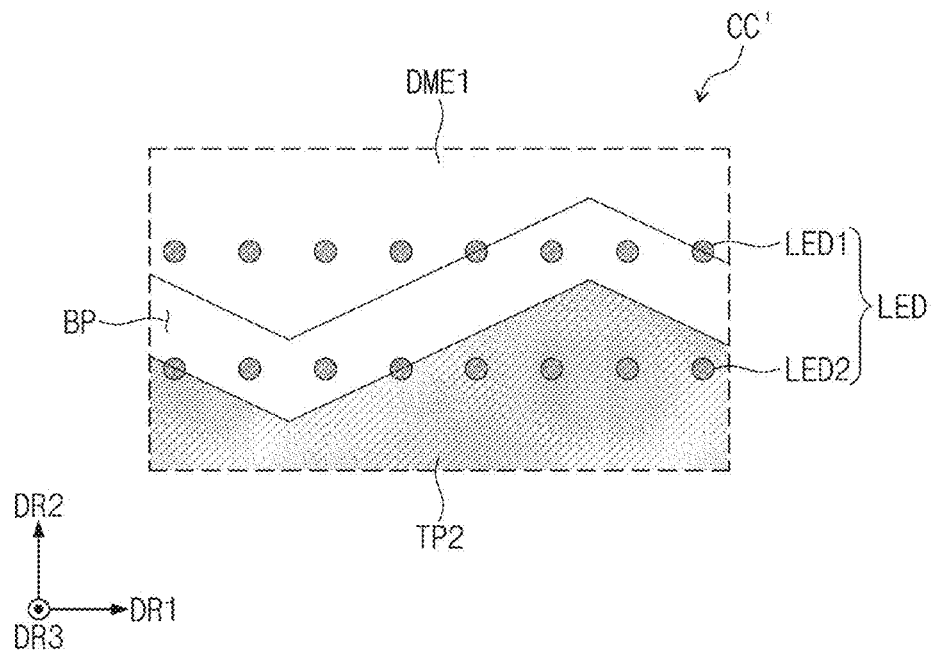
FIG. 10A is a plan view illustrating an arrangement relationship between the input sensor and light emitting elements in area CC' illustrated in FIG. 8.
Figure 10B:
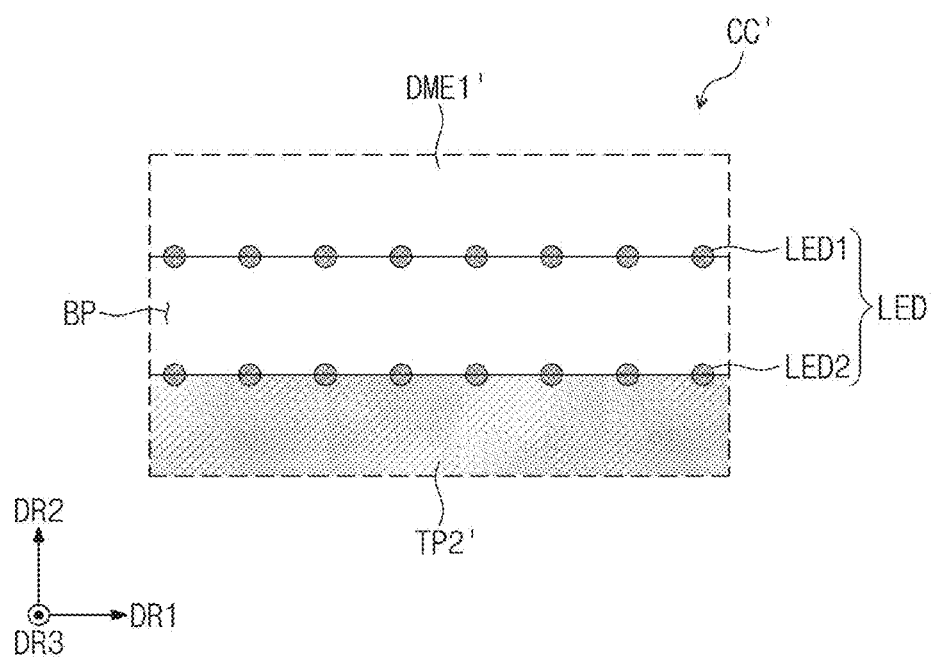
FIG. 10B is a plan view illustrating an arrangement relationship between the input sensor and the light emitting elements according to a comparative example.

FIG. 10A is a plan view illustrating an arrangement relationship between the input sensor and light emitting elements in area CC' illustrated in FIG. 8. FIG. 10B is a plan view illustrating an arrangement relationship between the input sensor and the light emitting elements according to a comparative example.

Referring to FIG. 10A, a plurality of light emitting elements LED may be provided. The light emitting elements LED may include a plurality of first light emitting elements LED1 and a plurality of second light emitting elements LED2 arranged in the first direction DR1. The first light emitting elements LED1 and the second light emitting elements LED2 may be spaced apart from each other in the second direction DR2. According to some embodiments of the present disclosure, at least one of (e.g., at least some of) the light emitting elements LED may overlap a side surface of the second transmission pattern TP2 having a zigzag shape and a side surface of the first dummy electrode DME1 having the zigzag shape on a plane (e.g., in a plan view). The light emitting elements LED may correspond to the light emitting area PXA (see, e.g., FIG. 4A). For example, the side surface of the second transmission pattern TP2 and the side surface of the first dummy electrode DME1 may overlap a plurality of light emitting areas PXA.

Referring to FIG. 10B, a side surface of a second transmission pattern TP2' and a side surface of a first dummy electrode DME1' may generally extend in a straight line in the first direction DR1. The side surface of the second transmission pattern TP2' and the side surface of the first dummy electrode DME1' may not have a zigzag shape. According to a comparative example, the first light emitting elements LED1 may overlap the side surface of the first dummy electrode DME1' on a plane (e.g., in a plan view), and the second light emitting elements LED2 may overlap the side surface of the second transmission pattern TP2' on a plane (e.g., in a plan view).

Referring to FIGS. 10A and 10B, the number of light emitting elements LED1 and LED2 that overlap the side surface of the second transmission pattern TP2 and the side surface of the first dummy electrode DME1 according to the present disclosure is smaller than the number of light emitting elements LED1 and LED2 that overlap the side surface of the second transmission pattern TP2' and the side surface of the first dummy electrode DME1' according to the comparative example. Even when the second transmission pattern TP2 and the first dummy electrode DME1 include a transparent conductive layer through which a light may pass, when the side surface of the second transmission pattern TP2, which is a reference of the second transmission pattern TP2 and a boundary part BP, and a side surface that is a reference of the first dummy electrode DME1 and the boundary part BP overlap the light emitting elements LED, stains may be visually recognized on the side surface of the second transmission pattern TP2 and the side surface of the first dummy electrode DME1 due to a difference between transmittances of lights emitted from the light emitting elements LED when a display is driven.

As the side surface of the second transmission pattern TP2 and the side surface of the first dummy electrode DME1 according to the present disclosure have a zigzag shape, the number of light emitting elements LED1 and LED2 that overlap the side surface of the second transmission pattern TP2 and the side surface of the first dummy electrode DME1 according to the present disclosure on a plane (e.g., in a plan view) may decrease, and when the display is driven, the occurrence of stains on the side surface of the second transmission pattern TP2 and the side surface of the first dummy electrode DME1 may be reduced. As a result, the electronic device ED (see, e.g., FIG. 1A) may have improved (e.g., increased) display quality.

Figure 11:
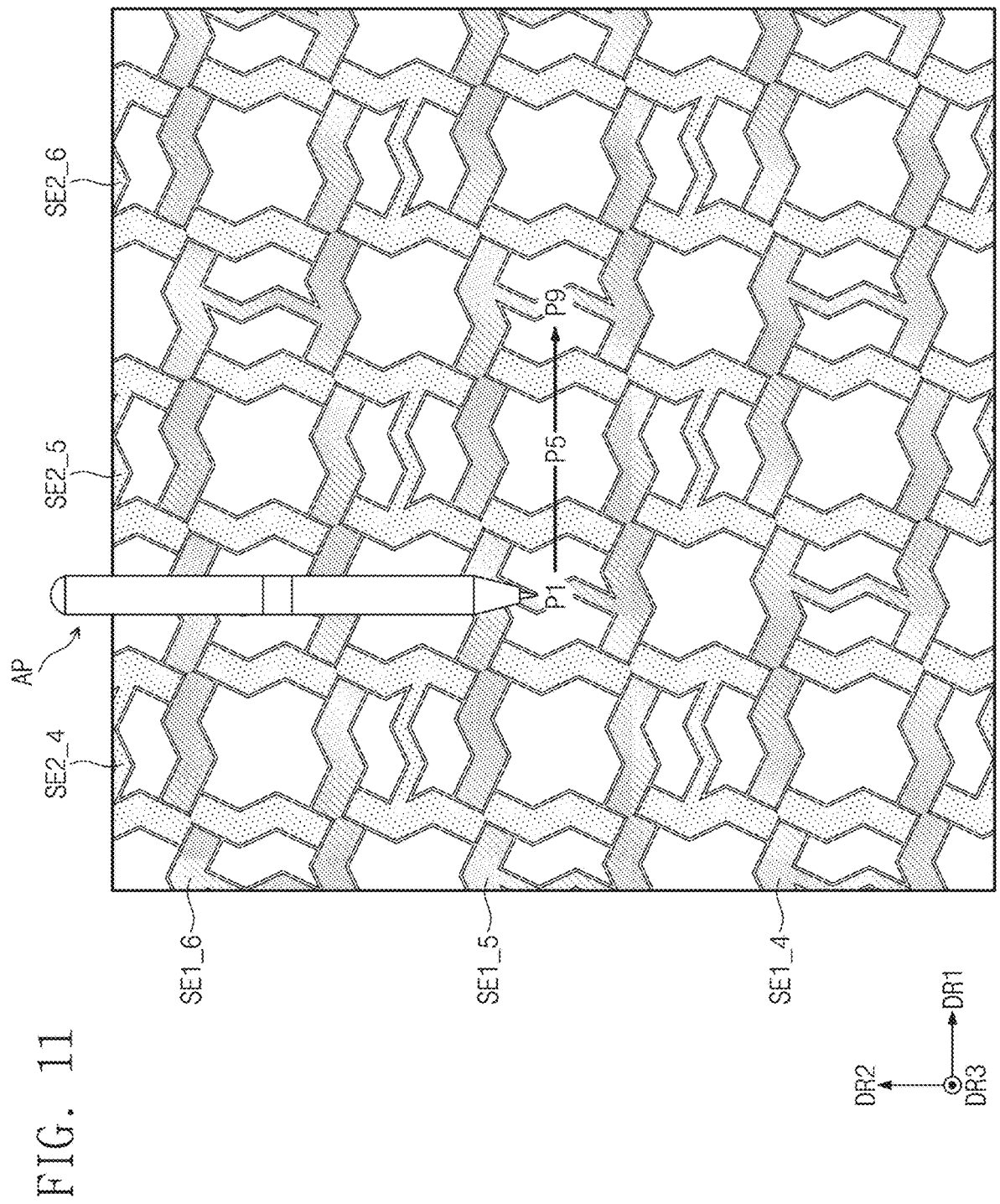
FIGS. 11-12B are views for describing an operation in a second mode according to some embodiments of the present disclosure.
Figure 12A:
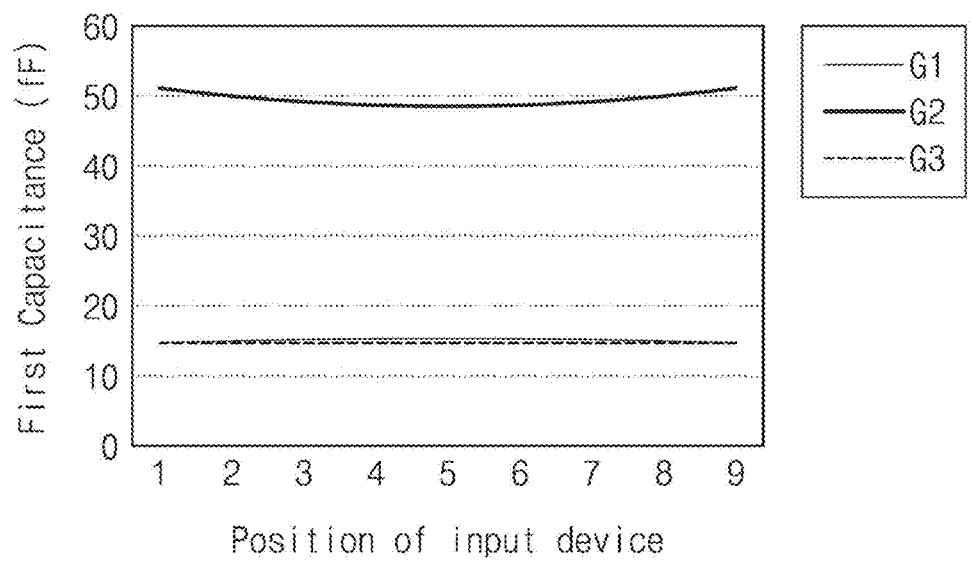
Figure 12B:
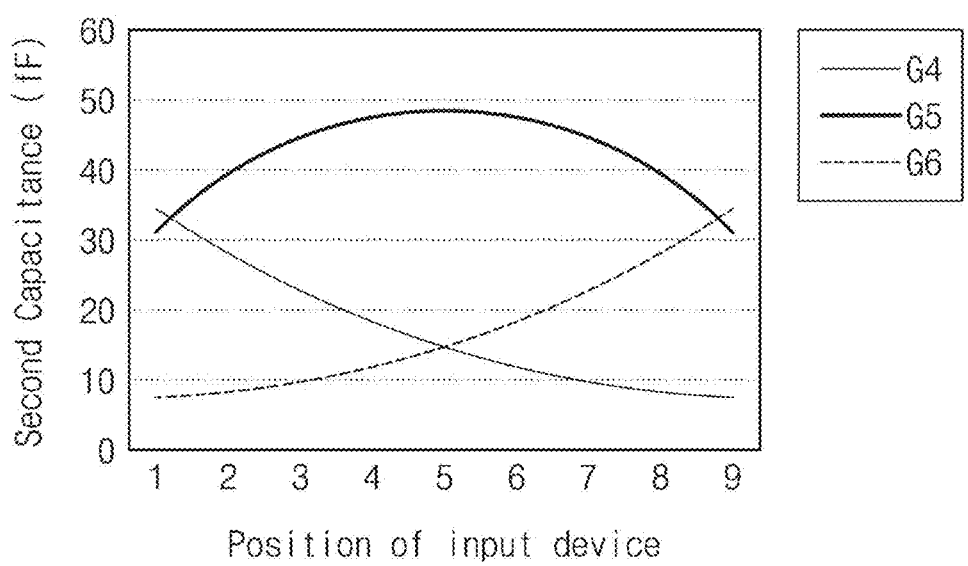

FIGS. 11 to 12B are views for describing an operation in a second mode according to some embodiments of the present disclosure.

FIG. 11 is a view illustrating that the input device AP moves in the input sensor ISP (see, e.g., FIG. 5) according to some embodiments of the present disclosure in the first direction DR1, FIG. 12A is a graph depicting a capacitance (or a first capacitance) between the input device AP and the first sensing electrodes SE1_4 to SE1_6 adjacent to the input device AP when the input sensor ISP senses a pressure caused by the input device AP, and FIG. 12B is a graph depicting a capacitance (or a second capacitance) between the input device AP and the second sensing electrodes SE2_4 to SE2_6 adjacent to the input device AP when the input sensor ISP senses a pressure caused by the input device AP. FIG. 11 illustrates a portion of the input sensor ISP, for example, some of the first sensing electrodes SE1_1 to SE1_$n$ and the second sensing electrodes SE2_1 to SE2_$m$ illustrated in FIG. 8. In more detail, FIG. 11 illustrates only $(1\text{-}4)^{th}$ to $(1\text{-}6)^{th}$ sensing electrodes SE1_4 to SE1_6 and $(2\text{-}4)^{th}$ to $(2\text{-}6)^{th}$ sensing electrodes SE2_4 to SE2_6.

Referring to FIG. 11, when the input device AP moves in the input sensor ISP from point P1 to point P9 in the first direction DR1, the sensor controller 100 may calculate coordinates x and y on the input sensor ISP of the input device AP. As an example of the present disclosure, the sensor controller 100 (see, e.g., FIG. 3A) may use a centroid method when calculating the coordinates x and y. In the present disclosure, an x-axis may be parallel to the first direction DR1, and a y-axis may be parallel to the second direction DR2. In the centroid method, the coordinates may be calculated based on a physical position of the input device AP, a physical position of a particular sensing electrode in which the input device AP is positioned, and a capacitance between the input device AP and the specific sensing electrode in which the input device AP is positioned. To calculate accurate coordinates through the centroid method, a signal recognized by an adjacent sensing electrode adjacent to the specific sensing electrode in addition to a signal recognized by the specific sensing electrode in which the input device AP is positioned should be generated at a certain level or higher. For example, for sensing a fine movement of the input device AP.

Referring to FIGS. 11 and 12A, when the input device AP moves in the input sensor ISP from point P1 to point P9 in the first direction DR1, a capacitance between the input device AP and the $(1\text{-}4)^{th}$ sensing electrode SE1_4, a capacitance between the input device AP and the $(1\text{-}5)^{th}$ sensing electrode SE1_5, and a capacitance between the input device AP and the $(1\text{-}6)^{th}$ sensing electrode SE1_6 may be identified. In more detail, a first graph G1 depicts the capacitance between the input device AP and the $(1\text{-}4)^{th}$ sensing electrode SE1_4 according to the position of the input device AP, a second graph G2 depicts the capacitance between the input device AP and the $(1\text{-}5)^{th}$ sensing electrode SE1_5 according to the position of the input device AP, and a third graph G3 depicts the capacitance between the input device AP and the $(1\text{-}6)^{th}$ sensing electrode SE1_6 according to the position of the input device AP.

When the input device AP moves on the input sensor ISP from point P1 to point P9 in the first direction DR1, referring to the first graph G1 and the third graph G3, the capacitance between the input device AP and the $(1\text{-}4)^{th}$ sensing electrode SE1_4 and the capacitance between the input device AP and the $(1\text{-}6)^{th}$ sensing electrode SE1_6 are constant or substantially constant at about 15 fF, and referring to the second graph G2, the capacitance between the input device AP and the $(1\text{-}5)^{th}$ sensing electrode SE1_5 is constant or substantially constant at about 50 fF. For example, this may refer to that, when the input device AP moves in the first direction DR1, a value of the y coordinate remains constant substantially constant, and thus the sensor controller 100 may accurately calculate the y coordinate of the input device AP through a signal received through the input sensor ISP.

Referring to FIGS. 11 and 12B, when the input device AP moves in the input sensor ISP from point P1 to point P9 in the first direction DR1, a capacitance between the input device AP and the $(2\text{-}4)^{th}$ sensing electrode SE2_4, a capacitance between the input device AP and the $(2\text{-}5)^{th}$ sensing electrode SE2_5, and a capacitance between the input device AP and the $(2\text{-}6)^{th}$ sensing electrode SE2_6 may be identified. In more detail, a fourth graph G4 depicts the capacitance between the input device AP and the $(2\text{-}4)^{th}$ sensing electrode SE2_4 according to the position of the input device AP, a fifth graph G5 depicts the capacitance between the input device AP and the $(2\text{-}5)^{th}$ sensing electrode SE2_5 according to the position of the input device AP, and a sixth graph G6 depicts the capacitance between the input device AP and the $(2\text{-}6)^{th}$ sensing electrode SE2_6 according to the position of the input device AP.

When the input device AP moves in the input sensor ISP from point P1 to point P9 in the first direction DR1, referring to the fourth graph G4, the capacitance between the input device AP and the $(2\text{-}4)^{th}$ sensing electrode SE2_4 decreases, referring to the fifth graph G5, the capacitance between the input device AP and the $(2\text{-}5)^{th}$ sensing electrode SE2_5 increases and then decreases, and referring to the sixth graph G6, the capacitance between the input device AP and the $(2\text{-}6)^{th}$ sensing electrode SE2_6 increases. This may be because, as the input device AP moves from point P1 to point P9 in the first direction DR1, the input device AP moves away from the $(2\text{-}4)^{th}$ sensing electrode SE2_4, becomes closer to and then moves away from the $(2\text{-}5)^{th}$ sensing electrode SE2_5, and becomes closer to the $(2\text{-}6)^{th}$ sensing electrode SE2_6.

In the present disclosure, only when a capacitance between the input device AP and an adjacent sensing electrode adjacent to the specific sensing electrode is greater than or equal to a reference percentage (e.g., 15%) of the capacitance between the input device AP and the specific sensing electrode, the input sensor ISP according to the present disclosure may accurately calculate coordinates of the input device AP when the input device AP is positioned on the specific sensing electrode.

In the present disclosure, when the input device AP is positioned at point P5, the specific sensing electrode corresponds to the $(2\text{-}5)^{th}$ sensing electrode SE2_5, and the adjacent sensing electrode corresponds to the $(2\text{-}4)^{th}$ sensing electrode SE2_4 and the $(2\text{-}6)^{th}$ sensing electrode SE2_6. When the input device AP is positioned at point P5, the capacitance between the input device AP and the $(2\text{-}5)^{th}$ sensing electrode SE2_5 is about 48 fF, and capacitance between the input device AP and the $(2\text{-}4)^{th}$ sensing electrode SE2_4 and the capacitance between the input device AP and the $(2\text{-}6)^{th}$ sensing electrode SE2_6 are about 15 fF. For example, when the input device AP is positioned at point P5, the capacitance between the input device AP and the $(2\text{-}4)^{th}$ sensing electrode SE2_4 and the capacitance between the input device AP and the $(2\text{-}6)^{th}$ sensing electrode SE2_6 are about 30% or more of the capacitance between the input device AP and the $(2\text{-}5)^{th}$ sensing electrode SE2_5. Thus, the input sensor ISP according to the present disclosure may accurately calculate the x coordinate of the input device AP.

FIGS. 13A to 14C are enlarged views of area AA' illustrated in FIG. 5 according to some embodiments of the present disclosure. Hereinafter, a description duplicated with the above description will not be provided.

Figure 13A:
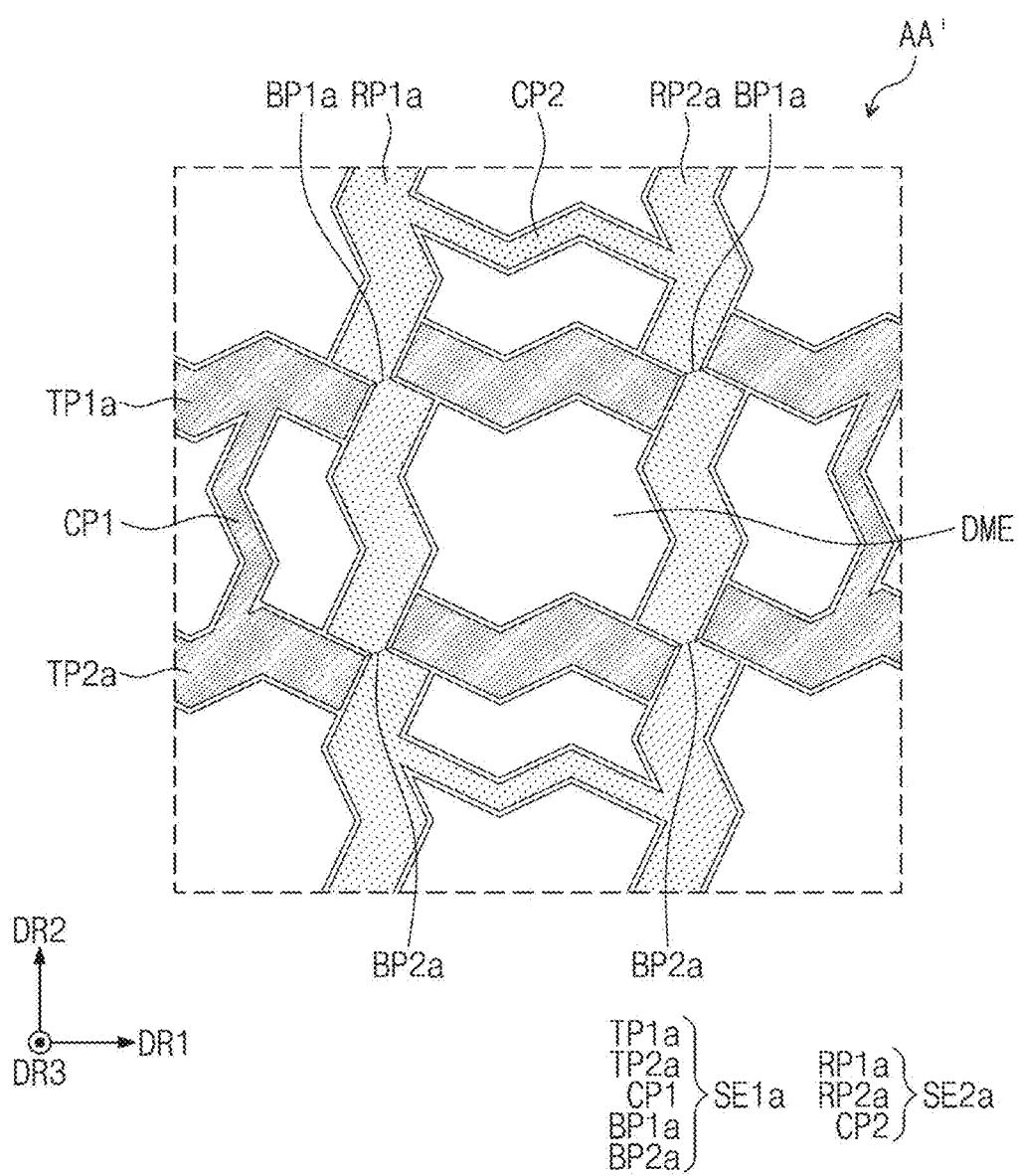
FIG. 13A is an enlarged view of area AA' illustrated in FIG. 5 according to some embodiments of the present disclosure.

Referring to FIG. 13A, a first sensing electrode SE1a may include a first transmission pattern TP1a, a second transmission pattern TP2a, and the first connection pattern CP1 that electrically connects the first transmission pattern TP1a and the second transmission pattern TP2a.

A plurality of first transmission patterns TP1a may be provided. The first transmission patterns TP1a may be arranged in the first direction DR1. The second transmission pattern TP2a may be spaced apart from the first transmission pattern TP1a in the second direction DR2. A plurality of second transmission patterns TP2a may be provided to correspond to the first transmission patterns TP1a. The first transmission patterns TP1a and the second transmission patterns TP2a may correspond to each other on a one-to-one correspondence. The first transmission patterns TP1a and the second transmission patterns TP2a may generally extend in the first direction DR1 and have a zigzag shape.

A second sensing electrode SE2a may include a first reception pattern RP1a, a second reception pattern RP2a, and the second connection pattern CP2 that electrically connects the first reception pattern RP1a and the second reception pattern RP2a.

A plurality of first reception patterns RP1a may be provided. The first reception pattern RP1a may generally extend in the second direction DR2. The second reception pattern RP2a may be spaced apart from the first reception patterns RP1a in the first direction DR1. A plurality of second reception patterns RP2a may be provided. The second reception patterns RP2a may be arranged in the second direction DR2. The first reception patterns RP1a and the second reception patterns RP2a may generally extend in the second direction DR2 and have a zigzag shape. In some embodiments, the first reception patterns RP1a and the second reception patterns RP2a may be connected by the reception connection pattern RCP (see, e.g., FIG. 9B).

The first transmission patterns TP1a may be separated from each other by the first reception pattern RP1a and the second reception pattern RP2a, and the second transmission patterns TP2a may be separated from each other by the first reception pattern RP1a and the second reception pattern RP2a. The first sensing electrode SE1a may further include a first bridge pattern BP1a that electrically connects the first transmission patterns TP1a to each other and a second bridge pattern BP2a that electrically connects the second transmission patterns TP2a to each other. The first bridge pattern BP1a and the second bridge pattern BP2a may overlap the first reception pattern RP1a and the second reception pattern RP2a on a plane (e.g., in a plan view), respectively. The first bridge pattern BP1a and the second bridge pattern BP2a may be arranged on a different layer from that of the first reception pattern RP1a and the second reception pattern RP2a. For example, the first bridge pattern BP1a and the second bridge pattern BP2a may be arranged on the base insulating layer 201 (see, e.g., FIG. 9B), and the first reception pattern RP1a and the second reception pattern RP2a may be arranged on the sensing insulating layer 203 (see, e.g., FIG. 9B).

Figure 13B:
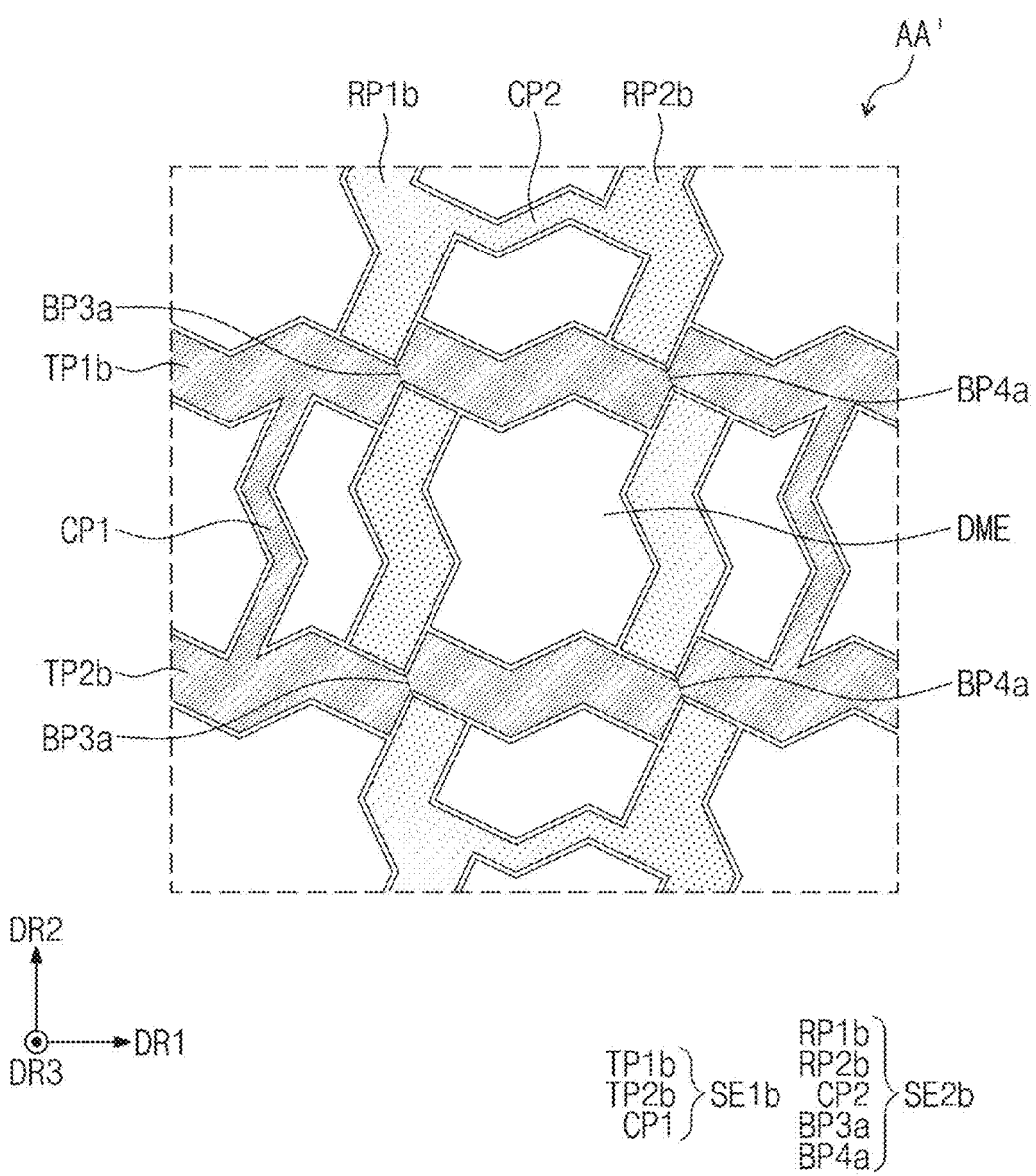
FIG. 13B is an enlarged view of area AA' illustrated in FIG. 5 according to some embodiments of the present disclosure.

Referring to FIG. 13B, a first sensing electrode SE1b may include a first transmission pattern TP1b, a second transmission pattern TP2b, and the first connection pattern CP1 that electrically connects the first transmission pattern TP1b and the second transmission pattern TP2b.

A plurality of first transmission patterns TP1b may be provided. The first transmission patterns TP1b may be arranged in the first direction DR1. The second transmission pattern TP2b may be spaced apart from the first transmission patterns TP1b in the second direction DR2. A plurality of second transmission patterns TP2b may be provided. The second transmission patterns TP2b may be arranged in the first direction DR1. The first transmission patterns TP1b and the second transmission patterns TP2b may generally extend in the first direction DR1 and have a zigzag shape. In some embodiments, the first transmission patterns TP1b and the second transmission patterns TP2b may be connected by a transmission connection pattern.

The second sensing electrode SE2b may include a first reception pattern RP1b, a second reception pattern RP2b, and the second connection pattern CP2 that electrically connects the first reception pattern RP1b and the second reception pattern RP2b.

A plurality of first reception patterns RP1b may be provided. The first reception patterns RP1b may be arranged in the second direction DR2. The second reception pattern RP2b may be spaced apart from the first reception patterns RP1b in the first direction DR1. A plurality of second reception patterns RP2b may be provided to correspond to the first reception patterns RP1b. The first reception patterns RP1b and the second reception patterns RP2b may correspond to each other on a one-to-one correspondence. The first reception patterns RP1b and the second reception patterns RP2b may generally extend in the second direction DR2 and have a zigzag shape.

The first reception patterns RP1b may be separated from each other by the first transmission pattern TP1b and the second transmission pattern TP2b, and the second reception patterns RP2b may be separated from each other by the first transmission pattern TP1b and the second transmission pattern TP2b. The second sensing electrode SE2b may further include a third bridge pattern BP3a that electrically connects the first reception patterns RP1b to each other and a fourth bridge pattern BP4a that electrically connects the second reception patterns RP2b to each other. The third bridge pattern BP3a and the fourth bridge pattern BP4a may overlap the first transmission pattern TP1b and the second transmission pattern TP2b on a plane (e.g., in a plan view), respectively. The third bridge pattern BP3a and the fourth bridge pattern BP4a may be arranged on a different layer from that of the first transmission pattern TP1b and the second transmission pattern TP2b. For example, as illustrated in FIG. 9B, the third bridge pattern BP3a and the fourth bridge pattern BP4a may be arranged on the base insulating layer 201, and the first transmission pattern TP1b and the second transmission pattern TP2b may be arranged on the sensing insulating layer 203.

Figure 14A:
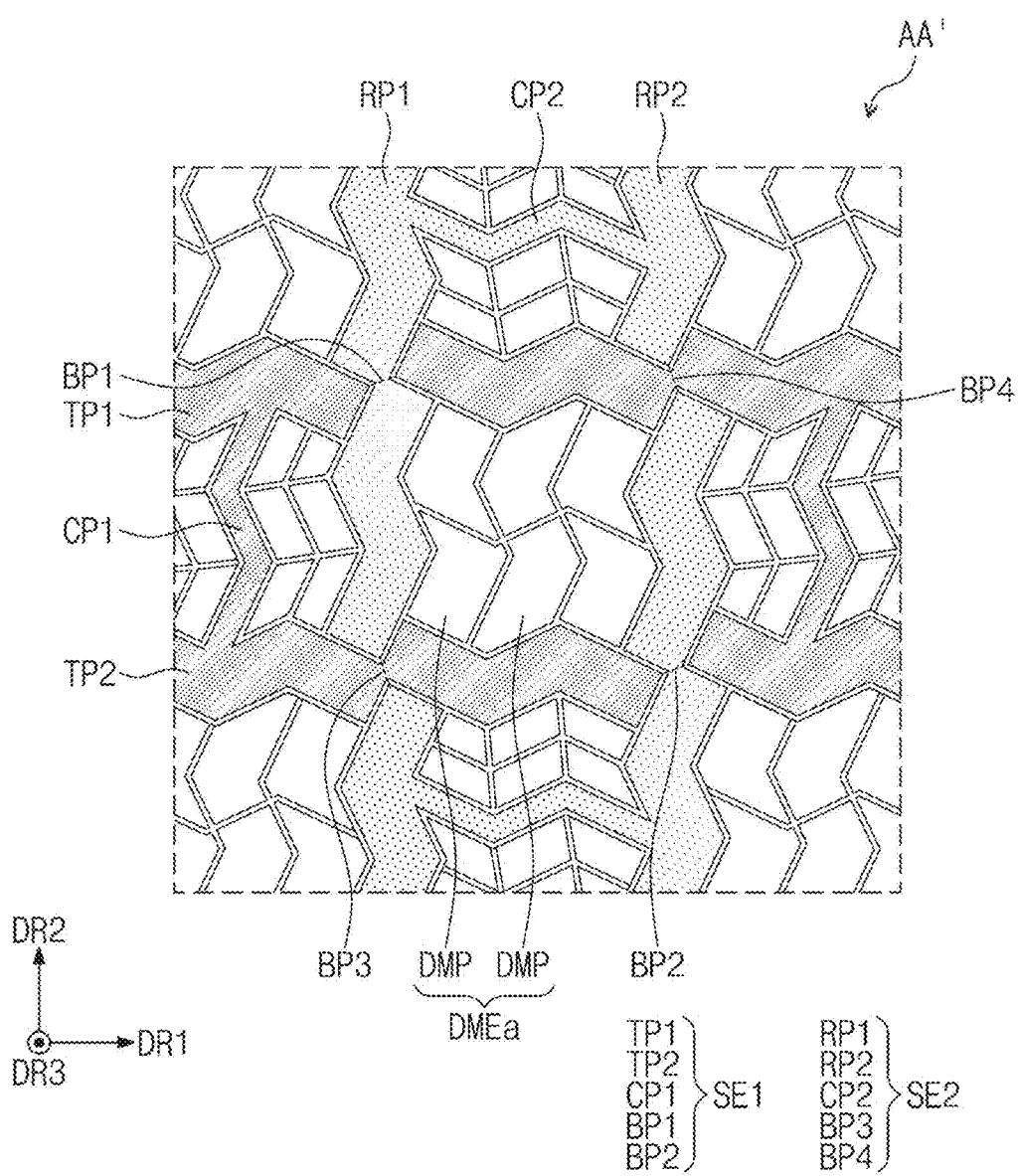
FIG. 14A is an enlarged view of area AA' illustrated in FIG. 5 according to some embodiments of the present disclosure.

Referring to FIG. 14A, each of dummy electrodes DMEa may include a plurality of dummy patterns DMP. The dummy patterns DMP may be spaced apart from each other. For example, the dummy patterns DMP may be electrically insulated from each other. The dummy patterns DMP may be floating electrodes that are electrically insulated from the first transmission patterns TP1, the second transmission patterns TP2, the first reception patterns RP1, and the second reception patterns RP2. The areas of the dummy patterns DMP may be the same or substantially the same. However, the present disclosure is not limited thereto, and the areas of the dummy patterns DMP may be different from each other.

As each of the dummy electrodes DMEa of the present disclosure includes dummy patterns DMP, even when at least one of the first transmission patterns TP1, the second transmission patterns TP2, the first reception patterns RP1, or the second reception patterns RP2 is short-circuited with one of the dummy patterns DMP when the input sensor ISP (see, e.g., FIG. 5) is manufactured, the areas of the sensing electrodes SE1 and SE2 are not excessively large, and thus degradation of sensing sensitivity of the input sensor ISP according to the present disclosure may be prevented or reduced. As a result, the input sensor ISP having improved (e.g., increased) reliability may be provided.

Figure 14B:
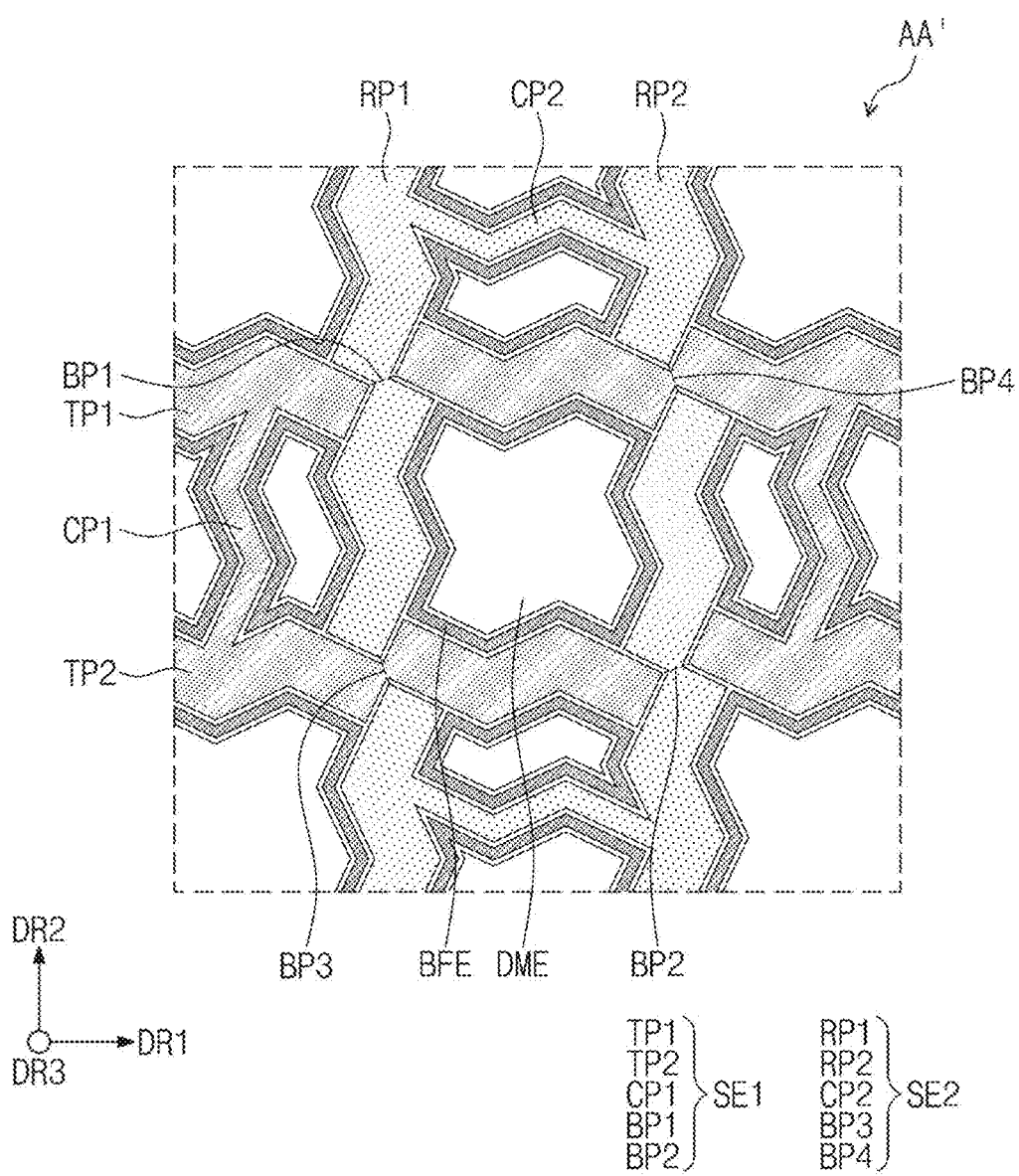
FIG. 14B is an enlarged view of area AA' illustrated in FIG. 5 according to some embodiments of the present disclosure.

Referring to FIG. 14B, the input sensor ISP (see, e.g., FIG. 5) may include buffer electrodes BFE that surround the dummy electrodes DME, respectively. The buffer electrodes BFE may be arranged between the dummy electrodes DME and the first sensing electrode SE1 and between the dummy electrodes DME and the second sensing electrode SE2. According to some embodiments of the present disclosure, the buffer electrodes BFE may be spaced apart by the same or substantially the same distance from the first transmission patterns TP1, the second transmission patterns TP2, the first reception patterns RP1, and the second reception patterns RP2. The buffer electrodes BFE may be floating electrodes that are electrically insulated from the first transmission patterns TP1, the second transmission patterns TP2, the first reception patterns RP1, and the second reception patterns RP2. A width of the buffer electrodes BFE in the first direction DR1 or the second direction DR2 may be smaller than a width of the dummy electrodes DME in the first direction DR1 or the second direction DR2.

The buffer electrodes BFE may include a transparent conductive layer. For example, the transparent conductive layer may include a transparent conductive oxide such as an indium tin oxide (ITO), an indium zinc oxide (IZO), a zinc oxide (ZnO), an indium zinc tin oxide (IZTO), and/or the like.

A side surface of each of the buffer electrodes BFE may have a zigzag shape. For example, the side surface of each of the buffer electrodes BFE may have a zigzag shape to correspond to the shapes of the first transmission patterns TP1, the second transmission patterns TP2, the first reception patterns RP1, and the second reception patterns RP2 that surround the buffer electrodes BFE.

As the input sensor ISP (see, e.g., FIG. 5) according to the present disclosure includes the buffer electrodes BFE between the dummy electrodes DME and the first sensing electrode SE1 and between the dummy electrodes DME and the second sensing electrode SE2, when the input sensor ISP (see, e.g., FIG. 5) is manufactured, short-circuiting between at least one of the first transmission patterns TP1, the second transmission patterns TP2, the first reception patterns RP1, or the second reception patterns RP2 and the dummy electrodes DME may be reduced or prevented.

Figure 14C:
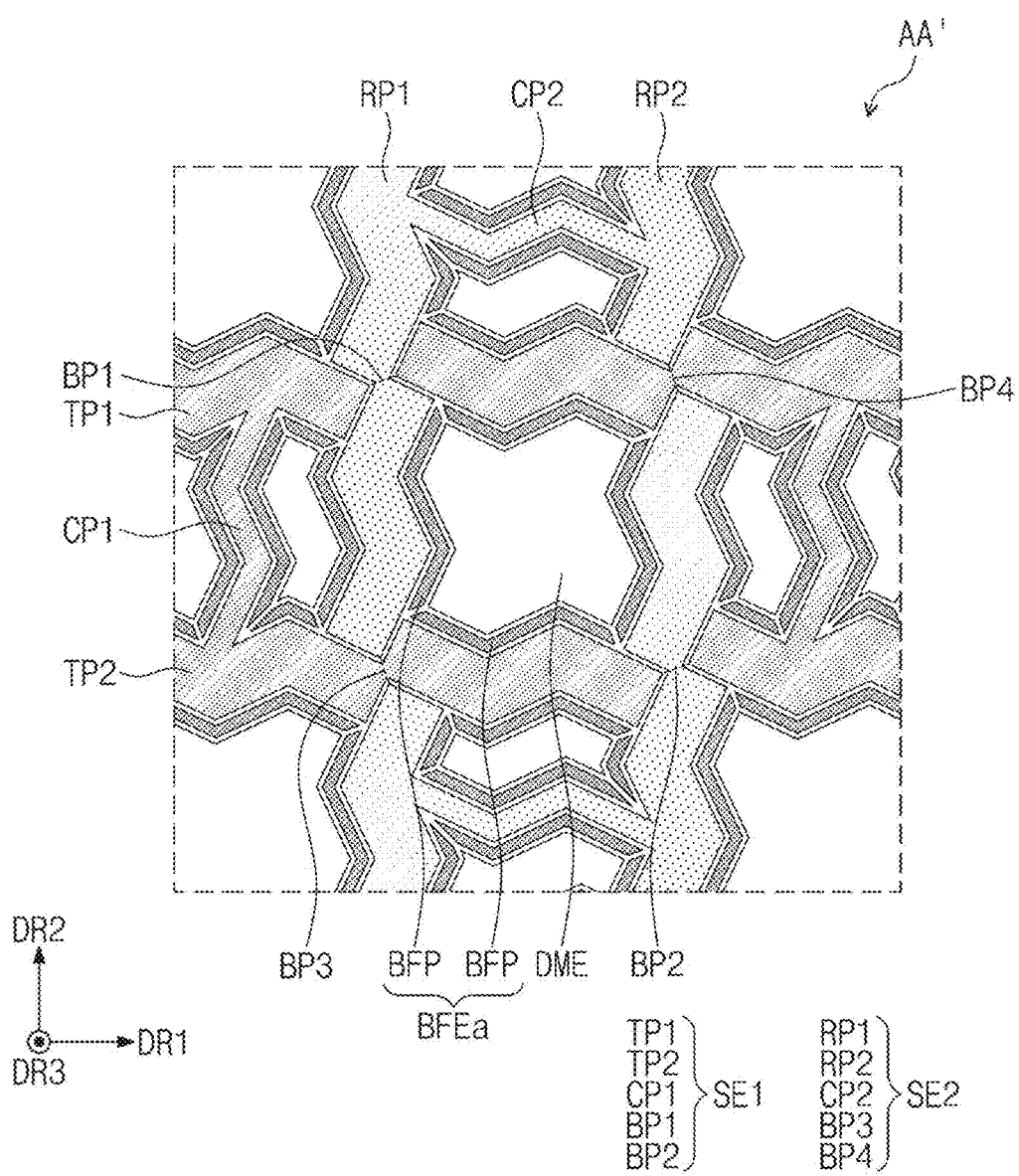
FIG. 14C is an enlarged view of area AA' illustrated in FIG. 5 according to some embodiments of the present disclosure.

Referring to FIG. 14C, each of buffer electrodes BFEa may include a plurality of buffer patterns BFP. The buffer patterns BFP may be spaced apart from each other. For example, the buffer patterns BFP may be electrically insulated from each other. FIG. 14C illustrates four buffer patterns BFP corresponding to the first transmission patterns TP1, the second transmission patterns TP2, the first reception patterns RP1, and the second reception patterns RP2, but the number of the buffer patterns BFP is not limited thereto.

As each of the buffer electrodes BFEa of the present disclosure includes the buffer patterns BFP, even when at least one of the first transmission patterns TP1, the second transmission patterns TP2, the first reception patterns RP1, or the second reception patterns RP2 is short-circuited with one of the buffer patterns BFP when the input sensor ISP (see, e.g., FIG. 5) is manufactured, the areas of the sensing electrodes SE1 and SE2 are not excessively large, and thus the degradation of the sensing sensitivity of the input sensor ISP according to the present disclosure may be reduced or prevented. As a result, the input sensor ISP having improved (e.g., increased) reliability may be provided.

A sensing electrode according to the present disclosure includes first connection patterns that electrically connect first transmission patterns and second transmission patterns. As a result, when an input sensor is manufactured, and when the first transmission patterns or the second transmission patterns arranged in a first direction and adjacent to each other are separated due to a scratch or the like, the first transmission patterns or the second transmission patterns may be prevented from floating by the first connection patterns, or instances thereof may be substantially reduced.

As a side surface of a transmission pattern according to the present disclosure has a zigzag shape, the number of light emitting elements overlapping the side surface of the transmission pattern on a plane (e.g., in a plan view) may decrease, and when a display is driven, the side surface of the transmission pattern is visually recognized, and thus occurrence of stains may be reduced. As a result, the electronic device having improved (e.g., increased) display quality may be provided.

As the input sensor according to the present disclosure includes buffer electrodes between dummy electrodes and the sensing electrodes, when the input sensor is manufactured, the sensing electrodes and the dummy electrodes may be prevented from short-circuiting each other, or instances thereof may be substantially reduced.

As utilized herein, the term "and/or" includes any and all combinations of one or more of the associated listed items. Throughout the disclosure, the expression "at least one of a, b or c", "at least one of a-c", "at least one of a to c", "at least one of a, b, and/or c", "at least one among a to c", etc., indicates only a, only b, only c, both (e.g., simultaneously) a and b, both (e.g., simultaneously) a and c, both (e.g., simultaneously) b and c, all of a, b, and c, or variations thereof.

In the present specification, "including A or B", "A and/or B", etc., represents A or B, or A and B.

The electronic device, the electronic apparatus, the electronic equipment, or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the description has been made above with reference to some embodiments of the present disclosure, it may be understood that those skilled in the art or those having ordinary knowledge in the art may variously modify and change the present disclosure without departing from the spirit and technical scope of the present disclosure described in the appended claims.

Thus, the technical scope of the present disclosure is not limited to the detailed description of the specification, but should be defined by the appended claims, and equivalents thereof.

What is claimed is:

1. An electronic device comprising:
    a display panel comprising a plurality of light emitting elements; and
    an input sensor on the display panel and comprises:
        a transmission electrode comprising a plurality of first transmission patterns arranged in a first direction and each having a zigzag shape, and a plurality of second transmission patterns arranged in the first direction and spaced apart from the first transmission patterns in a second direction crossing the first direction; and
        a reception electrode crossing the transmission electrode and comprising a plurality of first reception patterns arranged in the second direction, each of the first reception patterns extending having a zigzag shape,
    wherein one of the plurality of first reception patterns crosses one of the first transmission patterns at a first cross area and crosses an adjacent one of the second transmission patterns at a second cross area separated from the first cross area.

2. The electronic device of claim 1, wherein the transmission electrode further comprises:
    a first connection pattern configured to electrically connect at least one of the first transmission patterns and at least one of the second transmission patterns to each other, and
    wherein each of the second transmission patterns has a zigzag shape.

3. The electronic device of claim 2, wherein the reception electrode further comprises:
    a plurality of second reception patterns arranged in the second direction and spaced apart from the first reception patterns in the first direction; and
    a second connection pattern configured to electrically connect at least one of the first reception patterns and at least one of the second reception patterns to each other, and
    wherein each of the second reception patterns extends in the second direction and has a zigzag shape.

4. The electronic device of claim 3, wherein the electronic device further comprises a plurality of first connection patterns and a plurality of second connection patterns.

5. The electronic device of claim 4, wherein the input sensor further comprises dummy electrodes arranged between the transmission electrode and the reception electrode,
wherein at least one of the dummy electrodes is between two of the first connection patterns that are adjacent to each other in the first direction, and
wherein at least one of the dummy electrodes is between two of the second connection patterns that are adjacent to each other in the second direction.

6. The electronic device of claim 3, wherein a width of the first connection pattern is different from each of the widths of the first transmission patterns and the second transmission patterns, and
a width of the second connection pattern is different from each of the widths of the first reception patterns and the second reception patterns.

7. The electronic device of claim 6, wherein the width of the first connection pattern is smaller than each of the widths of the first transmission patterns and the second transmission patterns, and
the width of the second connection pattern is smaller than each of the widths of the first reception patterns and the second reception patterns.

8. The electronic device of claim 7, wherein the width of the first connection pattern is the same as the width of the second connection pattern.

9. The electronic device of claim 3, wherein the transmission electrode further comprises:
a plurality of first bridge patterns configured to electrically connect the first transmission patterns; and
a plurality of second bridge patterns configured to electrically connect the second transmission patterns.

10. The electronic device of claim 9, wherein the first bridge patterns and the second bridge patterns are alternately arranged in the first direction.

11. The electronic device of claim 10, wherein the reception electrode further comprises:
a plurality of third bridge patterns configured to electrically connect the first reception patterns; and
a plurality of fourth bridge patterns configured to electrically connect the second reception patterns.

12. The electronic device of claim 11, wherein the third bridge patterns and the fourth bridge patterns are alternately arranged in the second direction.

13. The electronic device of claim 11, wherein the first bridge patterns and the second bridge patterns are on a different layer from those of the first transmission patterns and the second transmission patterns, and
wherein the third bridge patterns and the fourth bridge patterns are on a different layer from those of the first reception patterns and the second reception patterns.

14. The electronic device of claim 3, wherein the first connection pattern has a zigzag shape extending in the second direction, and
wherein the second connection pattern has a zigzag shape extending in the first direction.

15. The electronic device of claim 1, wherein the input sensor further comprises:
dummy electrodes arranged between the transmission electrode and the reception electrode and electrically insulated from the transmission electrode and the reception electrode.

16. The electronic device of claim 15, wherein each of the dummy electrodes comprises a plurality of dummy patterns electrically insulated from each other.

17. The electronic device of claim 15, wherein a side surface of each of the dummy electrodes has a zigzag shape to correspond to shapes of the first transmission patterns and the first reception patterns adjacent to each of the dummy electrodes.

18. The electronic device of claim 15, wherein the input sensor further comprises buffer electrodes surrounding the dummy electrodes.

19. The electronic device of claim 18, wherein the buffer electrodes are electrically insulated from the dummy electrodes, the transmission electrode, and the reception electrode.

20. The electronic device of claim 18, wherein the buffer electrodes comprise a plurality of buffer patterns spaced apart from each other.

21. The electronic device of claim 18, wherein a width of each of the dummy electrodes is greater than a width of each of the buffer electrodes.

22. The electronic device of claim 1, wherein at least one of the light emitting elements arranged in the first direction overlaps side surfaces of the first transmission patterns on a plane.

23. The electronic device of claim 1, wherein a plurality of cross areas in which the first transmission patterns and the first reception patterns cross each other are defined in the input sensor, and
wherein each of the cross areas comprises a plurality of boundary areas in which one surfaces of the first transmission patterns and one surfaces of the first reception patterns face each other.

24. The electronic device of claim 1, wherein the electronic device further comprises a plurality of transmission electrodes arranged in the second direction, and
a plurality of reception electrodes arranged in the first direction.

25. The electronic device of claim 1, wherein the input sensor is configured to sense a first input in a first mode and to sense a second input in a second mode, and
the electronic device further comprises an input device configured to provide the second input to the input sensor.

26. An electronic device comprising:
a display panel comprising a plurality of light emitting elements; and
an input sensor on the display panel and comprising:
a plurality of transmission electrodes extending in a first direction and arranged in a second direction crossing the first direction;
a plurality of reception electrodes extending in the second direction and arranged in the first direction;
dummy electrodes arranged between the transmission electrodes and the reception electrodes and electrically insulated from the transmission electrodes and the reception electrodes; and
a plurality of buffer electrodes arranged between the dummy electrodes and the transmission electrodes and between the dummy electrodes and the reception electrodes, the buffer electrodes being electrically insulated from the dummy electrodes, the transmission electrodes, and the reception electrodes,
wherein the transmission electrode comprises a plurality of first transmission patterns arranged in the first direction and each having a zigzag shape, and a plurality of second transmission patterns arranged in the first direction and spaced apart from the first transmission patterns in the second direction, wherein the reception electrode comprises a plurality of first reception patterns arranged in the second direction, each of the first reception patterns extending having a zigzag shape, and wherein one of the plurality of first reception patterns crosses one of the first transmission patterns at a first cross area and crosses an adjacent one of the second transmission patterns at a second cross area separated from the first cross area.

27. The electronic device of claim 26, wherein each of the transmission electrodes further comprises:

a plurality of first connection patterns configured to electrically connect the first transmission patterns and the second transmission patterns to each other.

28. The electronic device of claim 27, wherein each of the reception electrodes further comprises:

a plurality of second reception patterns arranged in the second direction and spaced apart from the first reception patterns in the first direction; and a plurality of second connection patterns configured to electrically connect the first reception patterns and the second reception patterns to each other.

29. The electronic device of claim 28, wherein each of the first transmission patterns and the second transmission patterns extends in the first direction and has a zigzag shape, and each of the first reception patterns and the second reception patterns extends in the second direction and has a zigzag shape.

30. The electronic device of claim 28, wherein at least one of the dummy electrodes is between two of the first connection patterns that are adjacent to each other in the first direction, and wherein at least one of the dummy electrodes is between two of the second connection patterns that are adjacent to each other in the second direction.

31. The electronic device of claim 28, wherein the buffer electrodes are spaced apart from the first transmission patterns, the second transmission patterns, the first reception patterns, and the second reception patterns.

32. The electronic device of claim 28, wherein at least one of the dummy electrodes comprises a first sub-dummy electrode and a second sub-dummy electrode separated by the first connection patterns or the second connection patterns.

33. The electronic device of claim 26, wherein the transmission electrodes have a bar shape extending in the first direction, and the reception electrodes have a bar shape extending in the second direction.

34. The electronic device of claim 26, wherein each of the dummy electrodes comprises a plurality of dummy patterns electrically insulated from each other.

35. The electronic device of claim 26, wherein each of the buffer electrodes comprises a plurality of buffer patterns spaced apart from each other.

36. The electronic device of claim 26, wherein a width of the dummy electrodes is greater than a width of the buffer electrodes.

* * * * *